(12) United States Patent
Kato

(10) Patent No.: US 12,431,287 B2
(45) Date of Patent: Sep. 30, 2025

(54) MANUFACTURING METHOD FOR MULTILAYER CERAMIC ELECTRONIC COMPONENT

(71) Applicant: TAIYO YUDEN CO., LTD., Tokyo (JP)

(72) Inventor: Yasunari Kato, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 370 days.

(21) Appl. No.: 17/969,955

(22) Filed: Oct. 20, 2022

(65) Prior Publication Data

US 2023/0207199 A1 Jun. 29, 2023

(30) Foreign Application Priority Data

Dec. 24, 2021 (JP) .................................. 2021-210628

(51) Int. Cl.
*H01G 4/12* (2006.01)
*H01G 4/01* (2006.01)
(Continued)

(52) U.S. Cl.
CPC .................. *H01G 4/12* (2013.01); *H01G 4/01* (2013.01); *H01G 4/232* (2013.01); *H01G 4/30* (2013.01); *H01G 4/1227* (2013.01)

(58) Field of Classification Search
CPC ............ H01G 4/232; H01G 4/30; H01G 4/01; H01G 4/224; H01G 4/12–129
See application file for complete search history.

(56) References Cited

U.S. PATENT DOCUMENTS 4,771,520 A * 9/1988 Tanaka ..................... H01G 4/30
29/25.42
8,584,332 B2 * 11/2013 Matsui ................... H01G 4/002
29/25.42
(Continued)

FOREIGN PATENT DOCUMENTS

JP H06-263548 A 9/1994
JP H06-349673 A 12/1994
(Continued)

OTHER PUBLICATIONS

Japanese Office Action dated Aug. 12, 2025 in a counterpart Japanese patent application No. 2021-210628. (A machine translation (not reviewed for accuracy) attached).

*Primary Examiner* — Scott B Geyer
(74) *Attorney, Agent, or Firm* — CHEN YOSHIMURA LLP

(57) ABSTRACT

A method for manufacturing a multilayer ceramic electronic component includes: forming a pair of side margin portions on side surfaces of each of a plurality of unfired laminates, respectively, by thermocompression bonding a ceramic sheet containing 10% by mass or more of a binder resin to one of the side surfaces of the laminate for forming each of the side margin portions, performing a first heat treatment on the plurality of laminates having the pair of side margin portions formed thereon in a first condition so as to remove a portion of the binder resin contained in the side margin portions; and thereafter, performing a second heat treatment on the plurality of laminates having the pair of side margin portions formed thereon in a second condition that is different from the first condition so as to remove a remaining binder resin from the side margin portions.

8 Claims, 22 Drawing Sheets

(51) Int. Cl.
*H01G 4/232* (2006.01)
*H01G 4/30* (2006.01)

(56) References Cited

U.S. PATENT DOCUMENTS

| | | | | |
|---|---|---|---|---|
| 9,240,333 B2* | 1/2016 | Matsui | ...................... | H01G 4/06 |
| 9,328,026 B2* | 5/2016 | Okajima | .................. | H01G 4/30 |
| 10,256,044 B2* | 4/2019 | Juhng | .................. | H01G 13/006 |
| 10,453,615 B2* | 10/2019 | Fukunaga | .............. | H01G 4/232 |
| 10,650,973 B2* | 5/2020 | Takagi | ..................... | H01G 4/12 |
| 11,145,464 B2* | 10/2021 | Choe | ........................ | H01G 4/30 |
| 11,551,873 B2* | 1/2023 | Hattori | .................... | H01G 4/10 |
| 2005/0095851 A1* | 5/2005 | Watanabe | ................ | H01G 4/30 |
| | | | | 438/663 |
| 2009/0246541 A1* | 10/2009 | Nonaka | ..................... | B32B 3/02 |
| | | | | 501/135 |
| 2012/0234462 A1 | 9/2012 | Matsui et al. | | |
| 2014/0022694 A1* | 1/2014 | Reynolds | ............. | H01G 4/1209 |
| | | | | 216/6 |
| 2015/0055273 A1* | 2/2015 | Endo | ....................... | H01C 7/008 |
| | | | | 361/301.4 |
| 2017/0186552 A1* | 6/2017 | Abe | ......................... | H01G 4/40 |
| 2018/0096793 A1* | 4/2018 | Fukunaga | ................ | H01G 4/30 |
| 2020/0058447 A1* | 2/2020 | Choe | .................... | H01G 4/1227 |
| 2020/0234880 A1* | 7/2020 | Kim | ...................... | H01G 4/012 |
| 2021/0005385 A1 | 1/2021 | Lee et al. | | |
| 2021/0020377 A1* | 1/2021 | Kurosu | .................... | H01G 4/12 |
| 2021/0304967 A1* | 9/2021 | Hoshino | .................. | H01G 4/12 |
| 2021/0335541 A1* | 10/2021 | Ikeda | ..................... | H01G 4/008 |
| 2022/0013292 A1* | 1/2022 | Kobayashi | ................ | H01G 4/30 |
| 2022/0093340 A1* | 3/2022 | Matsui | ................ | H01G 4/0085 |
| 2022/0102075 A1* | 3/2022 | Kitahara | .................. | H01G 4/30 |
| 2022/0246354 A1* | 8/2022 | Takano | .................. | H01G 4/012 |
| 2023/0016359 A1* | 1/2023 | Shimada | ............... | H01G 4/1227 |

FOREIGN PATENT DOCUMENTS

| | | |
|---|---|---|
| JP | H11-340076 A | 12/1999 |
| JP | 2000-290077 A | 10/2000 |
| JP | 2006-100358 A | 4/2006 |
| JP | 2012-209539 A | 10/2012 |
| JP | 2016-200328 A | 12/2016 |
| JP | 2021-009986 A | 1/2021 |

\* cited by examiner

MANUFACTURING METHOD FOR MULTILAYER CERAMIC ELECTRONIC COMPONENT

BACKGROUND OF THE INVENTION

Technical Field

The present invention relates to a method of manufacturing a multilayer ceramic electronic component to which side margin portions are formed in a later stage of the manufacture.

Background Art

A technique for forming side margin portions in a later stage in the manufacturing process of multilayer ceramic electronic components such as multilayer ceramic capacitors is known (see Patent Document 1, for example). This technique is advantageous in reducing the size and increasing the capacity of the multilayer ceramic capacitor, since thin side margin portions can reliably protect the side surfaces of the multilayer body where the internal electrodes are exposed.

For example, in the method for manufacturing a multiplayer ceramic capacitor described in Patent Document 1, a laminated sheet in which ceramic sheets having internal electrodes printed thereon are laminated is cut, and a plurality of laminates having the cut surfaces exposing the internal electrodes at side surfaces are produced. Then, an adhesive is applied to the side surface of the laminate, and a side margin portion is formed on the side surface of the laminate by punching out a ceramic sheet by the side surface of the laminate.

RELATED ART DOCUMENT

Patent Document

Patent Document 1: Japanese Patent Application Laid-Open Publication No. 2012-209539

SUMMARY OF THE INVENTION

However, in the manufacturing method described in Patent Document 1, the step of applying the adhesive to the side surface is complicated. On the other hand, if a highly adhesive ceramic sheet is used, the side margin portions of different ceramic main bodies may stick together in the heating process after forming the side margin portions, making handling difficult.

In view of the circumstances as described above, an object of the present invention is to provide a manufacturing method for a multilayer ceramic electronic component, capable of reducing the number of processes for forming side margin portions and suppressing sticking of side margin portions of different ceramic main bodies.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a method for manufacturing a multilayer ceramic electronic component, comprising: forming a pair of side margin portions on side surfaces of each of a plurality of unfired laminates, respectively, by thermocompression bonding a ceramic sheet containing 10% by mass or more of a binder resin to one of the side surfaces of the laminate for forming each of the side margin portions, each of the laminates having a substantially rectangular parallelepiped shape and including a plurality of internal electrodes stacked in a first axis direction via ceramic layers interposed therebetween, side edges of the plurality of internal electrodes being exposed at the side surfaces of the laminate in a second axis direction perpendicular to the first axis direction before being covered by the side margin portions, respectively; performing a first heat treatment on the plurality of laminates having the pair of side margin portions formed thereon in a first condition so as to remove a portion of the binder resin contained in the side margin portions; and thereafter, performing a second heat treatment on the plurality of laminates having the pair of side margin portions formed thereon in a second condition that is different from the first condition so as to remove a remaining binder resin from the side margin portions.

Here, the first heat treatment may be performed at a first temperature, and the second heat treatment may be performed at a second temperature that is higher than the first temperature.

The first heat treatment may include irradiating at least one of the pair of side margin portions of at least some of the plurality of the laminates having the pair of side margin portions formed thereon with light rays to locally heat the irradiated side margin portions so as to remove the portion of the binder resin from the irradiated side margin portions. The second heat treatment may include heating the plurality of laminates having the pair of side margin portions formed thereon in a furnace so as to remove the remaining binder resin.

The second heat treatment may include heating the plurality of laminates having the pair of side margin portions formed thereon in a state in which an intervening member is placed between the plurality of laminates arranged on a work surface that extends planarly.

The work surface may have the intervening member that extends planarly and that has a plurality of openings. The intervening member may have a mesh structure. The intervening member may include a plurality of particles, and the second heat treatment may include heating the plurality of laminates having the pair of side margin portions formed thereon in a state in which the plurality of laminates are mixed with the plurality of particles on the work surface. The work surface may have a plurality of protrusions as the intervening member.

In another aspect, the present disclosure provides a method for manufacturing a multilayer ceramic electronic component, comprising: forming a pair of side margin portions on side surfaces of each of a plurality of unfired laminates, respectively, by thermocompression bonding a ceramic sheet containing 10% by mass or more of a binder resin to one of the side surfaces of the laminate for forming each of the side margin portions, each of the laminates having a substantially rectangular parallelepiped shape and including a plurality of internal electrodes stacked in a first axis direction via ceramic layers interposed therebetween, side edges of the plurality of internal electrodes being exposed at the side surfaces of the laminate in a second axis direction perpendicular to the first axis direction before being covered by the side margin portions, respectively; and thereafter, performing a heat treatment on the plurality of laminates having the pair of side margin portions formed thereon in a state in which an intervening member is placed between the plurality of laminates arranged on a work surface that extends planarly so as to remove the binder resin from the side margin portions.

Here, the work surface may have the intervening member that extends planarly and that has a plurality of openings. The intervening member may have a mesh structure.

The intervening member may include a plurality of particles, and the heat treatment may include heating the plurality of laminates having the pair of side margin portions formed thereon in a state in which the plurality of laminates are mixed with the plurality of particles on the work surface. The work surface may have a plurality of protrusions as the intervening member.

As described above, according to at least some aspects of the present invention, there is provided a method for manufacturing a multilayer ceramic electronic component that can reduce the number of processes for forming side margin portions and can suppress sticking of the side margin portions of different ceramic main bodies.

It is to be understood that both the foregoing general description and the following detailed description are exemplary and explanatory, and are intended to provide further explanation of the invention as claimed.

DETAILED DESCRIPTION OF EMBODIMENTS

Hereinafter, embodiments of the present invention will be described with reference to the drawings.

The drawings show either mutually orthogonal X-, Y-, and Z-axes, or mutually orthogonal x-, y-, and z-axes, as appropriate. The Z-axis is an axis oriented vertically. The X-axis and Y-axis are horizontally oriented axes orthogonal to the Z-axis. The x-axis, y-axis, and z-axis are coordinate axes belonging to the multilayer ceramic capacitor 10.

Figure 1:
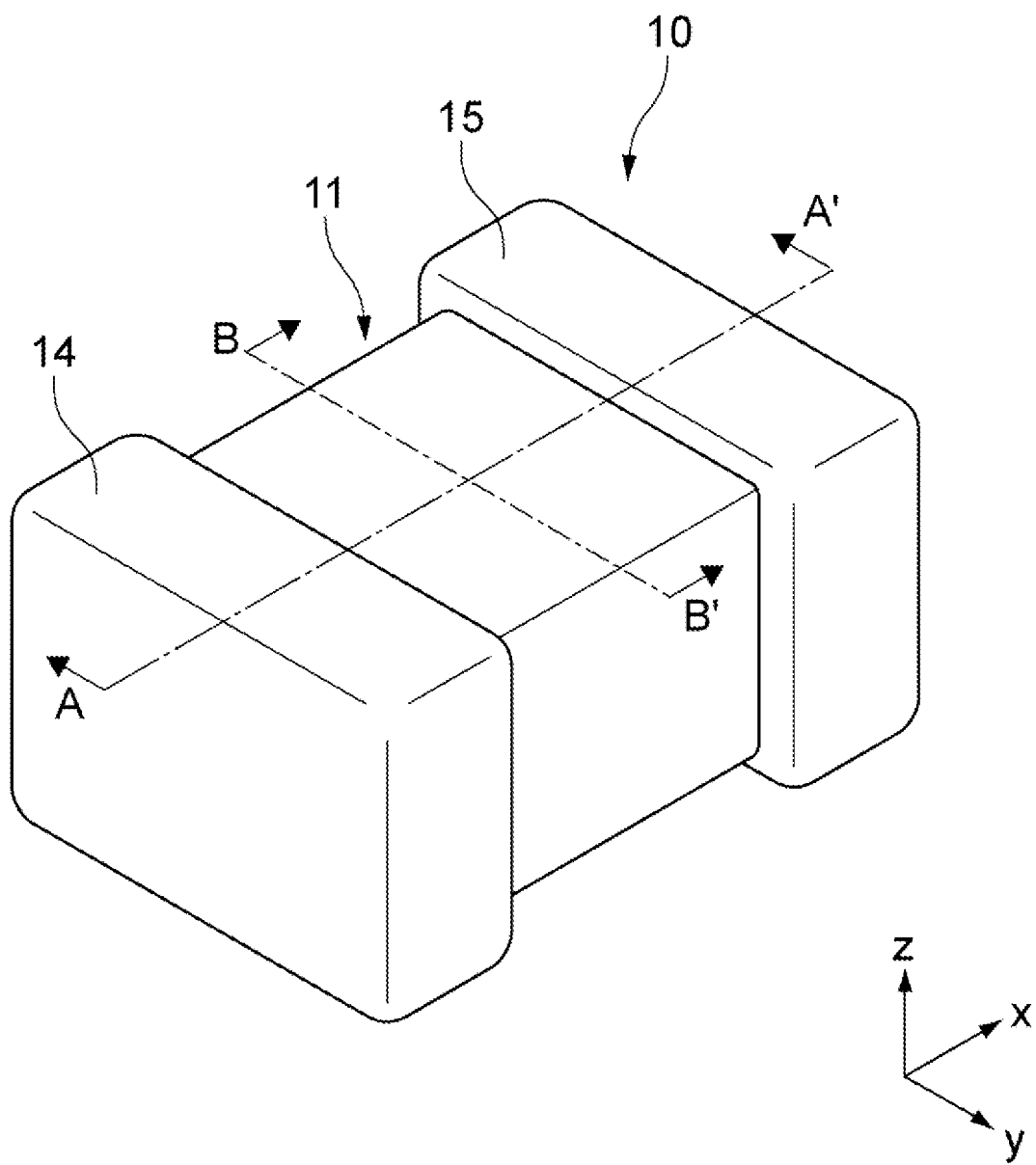
FIG. 1 is a perspective view of a multilayer ceramic capacitor according to a first embodiment of the present invention.
Figure 2:
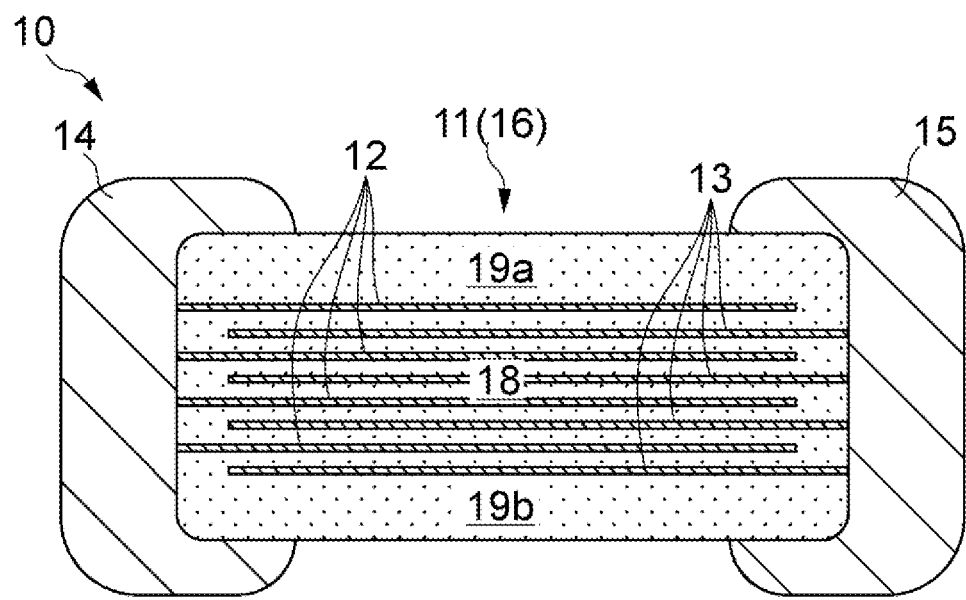
FIG. 2 is a cross-sectional view of the multilayer ceramic capacitor taken along the line A-A' in FIG. 1.
Figure 2:
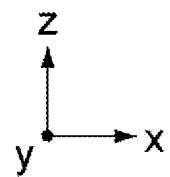
Figure 3:
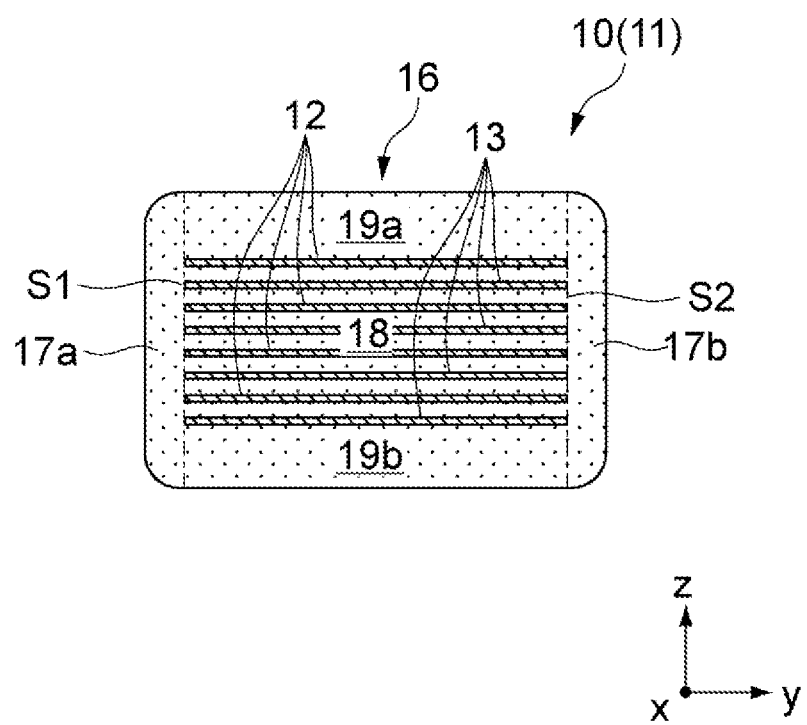
FIG. 3 is a cross-sectional view of the multilayer ceramic capacitor taken along the line B-B' of FIG. 1.

FIGS. 1 to 3 are diagrams showing a multilayer ceramic capacitor 10 according to a first embodiment of the present invention. FIG. 1 is a perspective view of the multilayer ceramic capacitor 10. FIG. 2 is a cross-sectional view of the multilayer ceramic capacitor 10 taken along the line A-A' in FIG. 1. FIG. 3 is a cross-sectional view of the multilayer ceramic capacitor 10 taken along the line B-B' of FIG. 1.

The multilayer ceramic capacitor 10 includes a ceramic main body 11, a first external electrode 14, and a second external electrode 15. The ceramic main body 11 has first and second end faces orthogonal to the x-axis direction, first and second side surfaces orthogonal to the y-axis direction, and first and second principal surfaces orthogonal to the z-axis direction, thereby having a substantially rectangular parallelepiped shape. Ridges connecting the surfaces of the ceramic main body 11 are rounded, for example.

The multilayer ceramic capacitor 10 has, for example, the following sizes. The maximum dimension in the x-axis direction of the multilayer ceramic capacitor 10 is, for example, 0.2 mm or more and 3.5 mm or less. The maximum dimension in the y-axis direction of the multilayer ceramic capacitor 10 is, for example, 0.1 mm or more and 2.8 mm or less. The maximum dimension in the z-axis direction of the multilayer ceramic capacitor 10 is, for example, 0.1 mm or more and 2.8 mm or less.

The external electrodes 14 and 15 cover the end faces of the ceramic main body 11 and face each other in the x-axis direction with the ceramic main body 11 interposed therebetween. The external electrodes 14 and 15 shown in FIG. 1 respectively extend from the end faces of the ceramic main body 11 to the principal surfaces and side surfaces. The shape of the external electrodes 14 and 15 is not limited to the example shown in FIG. 1.

The external electrodes 14 and 15 are made of a good electrical conductor. Good electrical conductors forming the external electrodes 14 and 15 include, for example, a metal or metal alloy having copper (Cu), nickel (Ni), tin (Sn), palladium (Pd), platinum (Pt), silver (Ag), gold (Au), or the like as the main component.

The ceramic main body 11 has a laminate 16, a first side margin portion 17a, and a second side margin portion 17b. The laminate 16 includes the first and second end surfaces orthogonal to the x-axis direction, first side surfaces S1 and second side surfaces S2 orthogonal to the y-axis direction, and first and second principal surfaces orthogonal to the z-axis direction, thereby having a substantially rectangular parallelepiped shape The first and second side margin portions 17a and 17b face each other in the y-axis direction with the laminate 16 interposed therebetween. The first and second side margin portions 17a and 17b cover the first and second side surfaces S1 and S2 of the laminate 16, respectively.

The laminate 16 has a structure in which a plurality of flat ceramic layers extending along the xy plane are laminated in the z-axis direction. The laminate 16 has a capacitance forming portion 18, a first cover portion 19a, and a second cover portion 19b. The first and second cover portions 19a and 19b cover the capacitance forming portion 18 from above and below in the z-axis direction, and provide a pair of main surfaces of the laminate 16.

The capacitance forming portion 18 has a plurality of sheet-like first internal electrodes 12 and second internal electrodes 13 arranged between a plurality of ceramic layers and each extending along the xy plane. The first and second internal electrodes 12 and 13 are alternately arranged along the z-axis direction. That is, the first and second internal electrodes 12 and 13 face each other in the z-axis direction with the ceramic layer interposed therebetween.

The first internal electrodes 12 are drawn out to the end face covered with the first external electrode 14. On the other hand, the second internal electrodes 13 are drawn out to the end face covered with the second external electrode 15. Thus, the first internal electrodes 12 are connected only to the first external electrode 14 and the second internal electrodes 13 are connected only to the second external electrode 15.

The first and second internal electrodes 12, 13 are made of a good electrical conductor. Nickel (Ni) is typically used as the good electrical conductor forming the first and second internal electrodes 12 and 13. In addition, a metal or metal alloy having copper (Cu), palladium (Pd), platinum (Pt), silver (Ag), or gold (Au), etc., as the main component may be used for the good electrical conductor.

The first and second internal electrodes 12 and 13 are formed across the entire width of the capacitance forming portion 18 in the y-axis direction and exposed to the first and second side surfaces S1 and S2 of the laminate 16, respectively. Since the first and second side surfaces S1 and S2 of the laminate 16 are covered with the first and second side margin portions 17a and 17b, insulation between the second internal electrodes 12 and 13 at the first and second side surfaces S1 and S2 of the laminate 16 can be ensured.

With such a configuration, in the multilayer ceramic capacitor 10, when a voltage is applied between the first external electrode 14 and the second external electrode 15, the voltage is applied to a plurality of ceramic layers between the first internal electrodes 12 and the second internal electrodes 1. As a result, in the multilayer ceramic capacitor 10, electric charges corresponding to the voltage between the first external electrode 14 and the second external electrode 15 are stored.

In the ceramic main body 11, a dielectric ceramic with a high dielectric constant is used in order to increase the capacitance formed by each ceramic layer between the internal electrodes 12 and 13. Such an dielectric ceramic with a high dielectric constant include, for example, perovskite structure materials containing barium (Ba) and titanium (Ti), a representative example of which is barium titanate ($BaTiO_3$).

Alternatively, the ceramic layer may be a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Ti, Zr)O_3$), barium calcium zirconate titanate ($(Ba, Ca)(Ti, Zr)O_3$), barium zirconate ($BaZrO_3$), and titanium oxide ($TiO_2$).

The first and second side margin portions 17a, 17b and the first and second cover portions 19a, 19b are also made of an insulating ceramic, preferably a dielectric ceramic having the same composition as the ceramic layers. In such a case, it is possible to suppress the occurrence of stress due to the difference in physical properties between the capacitance forming portion 18 and its surroundings.

[Manufacturing Method of Multilayer Ceramic Capacitor 10]

Figure 4:
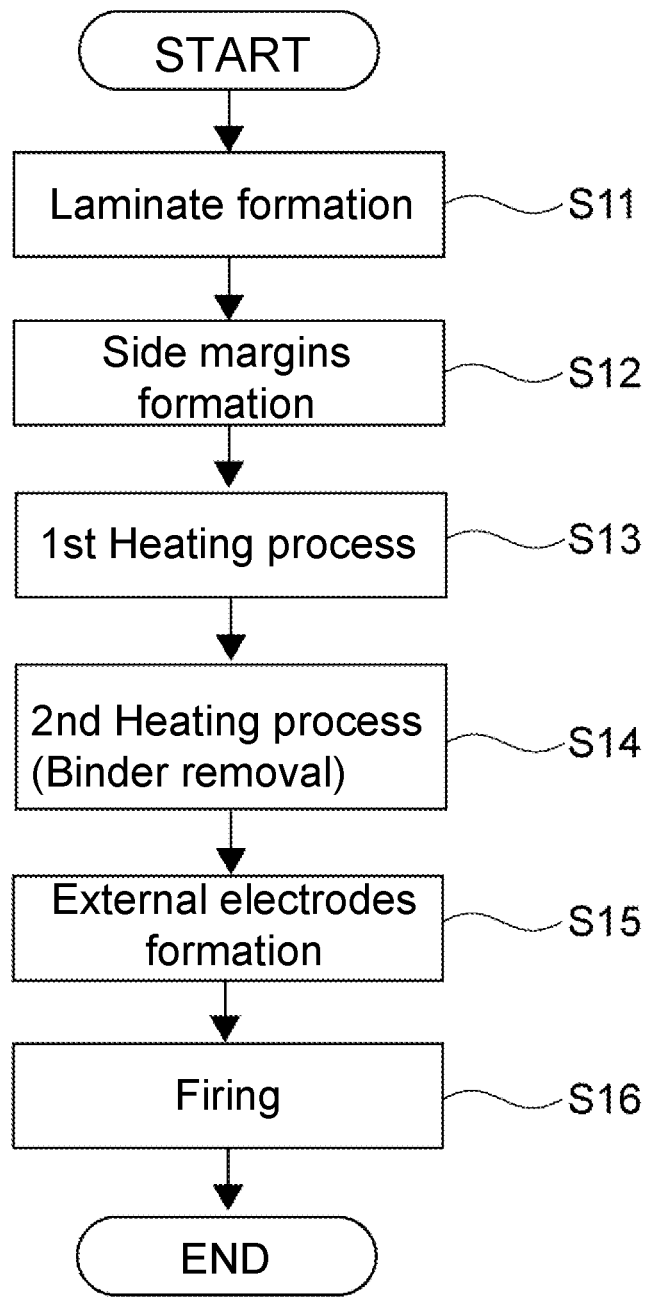
FIG. 4 is a flowchart showing a method for manufacturing a multiplayer ceramic capacitor according to a first embodiment of the present invention.

FIG. 4 is a flow chart showing the manufacturing method of the multilayer ceramic capacitor 10 according to the first embodiment. FIGS. 5 to 13 are diagrams showing various manufacturing steps of the multilayer ceramic capacitor 10. Hereinafter, the method for manufacturing the multilayer ceramic capacitor 10 will be described along FIG. 4 with reference to FIGS. 5 to 13 as appropriate.

(Step S11: Laminate Formation)

In step S11, first ceramic sheets 101 and second ceramic sheets 102 for forming the capacitance forming portion 18 and third ceramic sheets 103 for forming the first and second cover portions 19a and 19b are laminated and cut to produce an unfired laminate 116.

Figure 5:
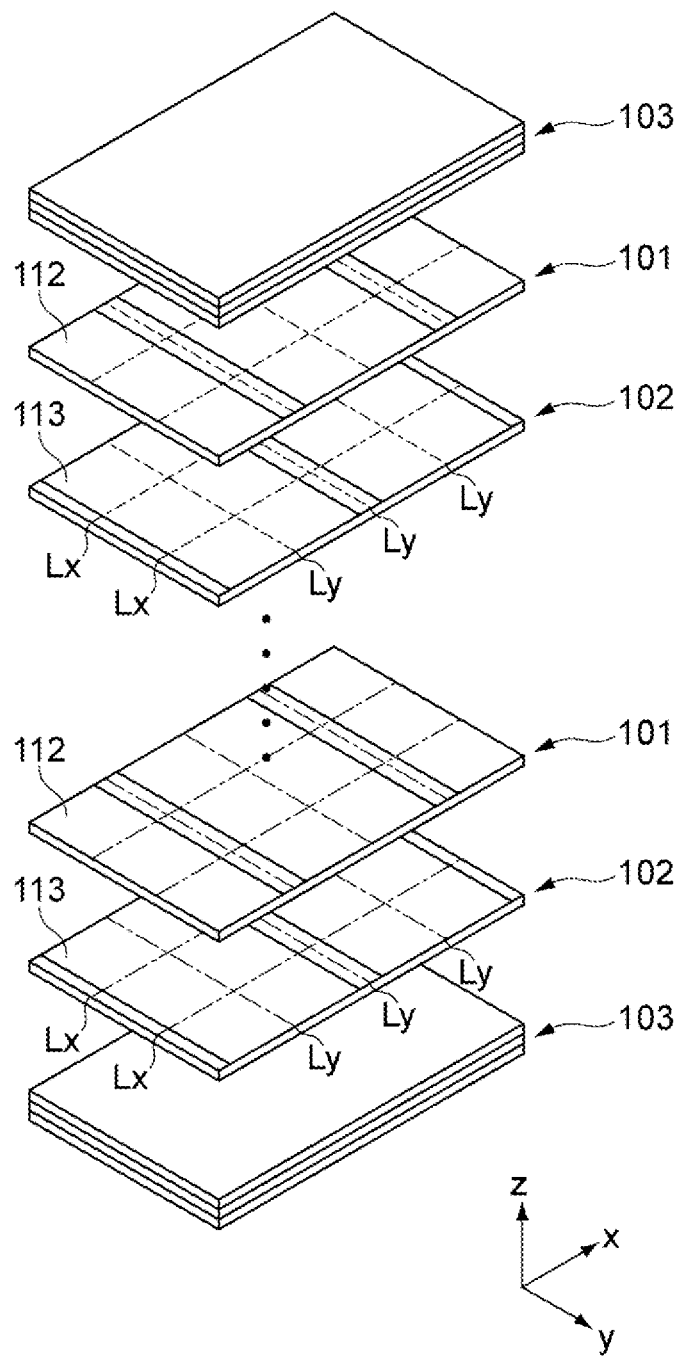
FIG. 5 is a perspective view showing the process of step S11.

The ceramic sheets 101, 102, 103 shown in FIG. 5 are configured as unfired ceramic green sheets. First, materials for the ceramic sheets 101, 102, 103 are mixed to obtain a slurry. The materials include a dielectric ceramic powder, a binder resin, an organic solvent, and additives such as a plasticizer. The slurry obtained by mixing these materials with a ball mill or the like is formed into a sheet by using a roll coater, a doctor blade, or the like.

The thickness of the ceramic sheets 101 and 102 is adjusted according to the target thickness of the ceramic layer after firing. The thickness of the third ceramic sheet 103 can be adjusted appropriately.

Unfired first internal electrodes 112 for the first internal electrodes 12 are formed on the first ceramic sheets 101. Unfired second internal electrodes 113 for the second internal electrodes 13 are formed on the second ceramic sheets 102. No internal electrodes are formed on the third ceramic sheet 103.

The internal electrodes 112, 113 respectively has a plurality of strip-shaped electrode patterns that cross the cutting line Lx parallel to the x-axis direction and extend along the cutting line Ly parallel to the y-axis direction. These internal electrodes 112 and 113 are formed by applying a conductive paste to the ceramic sheets 101 and 102 by screen printing, gravure printing, or the like.

The ceramic sheets 101 and 102 are alternately laminated in the z-axis direction, as shown in FIG. 5. A laminate of ceramic sheets 101 and 102 corresponds to the capacitance forming portion 18. The ceramic sheets 103 are laminated on the upper and lower surfaces of the laminate of the ceramic sheets 101 and 102 in the z-axis direction. The stack of ceramic sheets 103 corresponds to the first and second cover portions 19a and 19b. The number of laminated ceramic sheets 101, 102, 103 can be adjusted as appropriate.

Subsequently, the laminate of the ceramic sheets 101, 102, 103 is pressure-pressed from the z-axis direction and cut along the cutting lines Lx, Ly. For cutting the laminate, for example, a press cutting blade or a rotating blade can be used. This way, the laminate 116 shown in FIG. 6 is produced.

Figure 6:
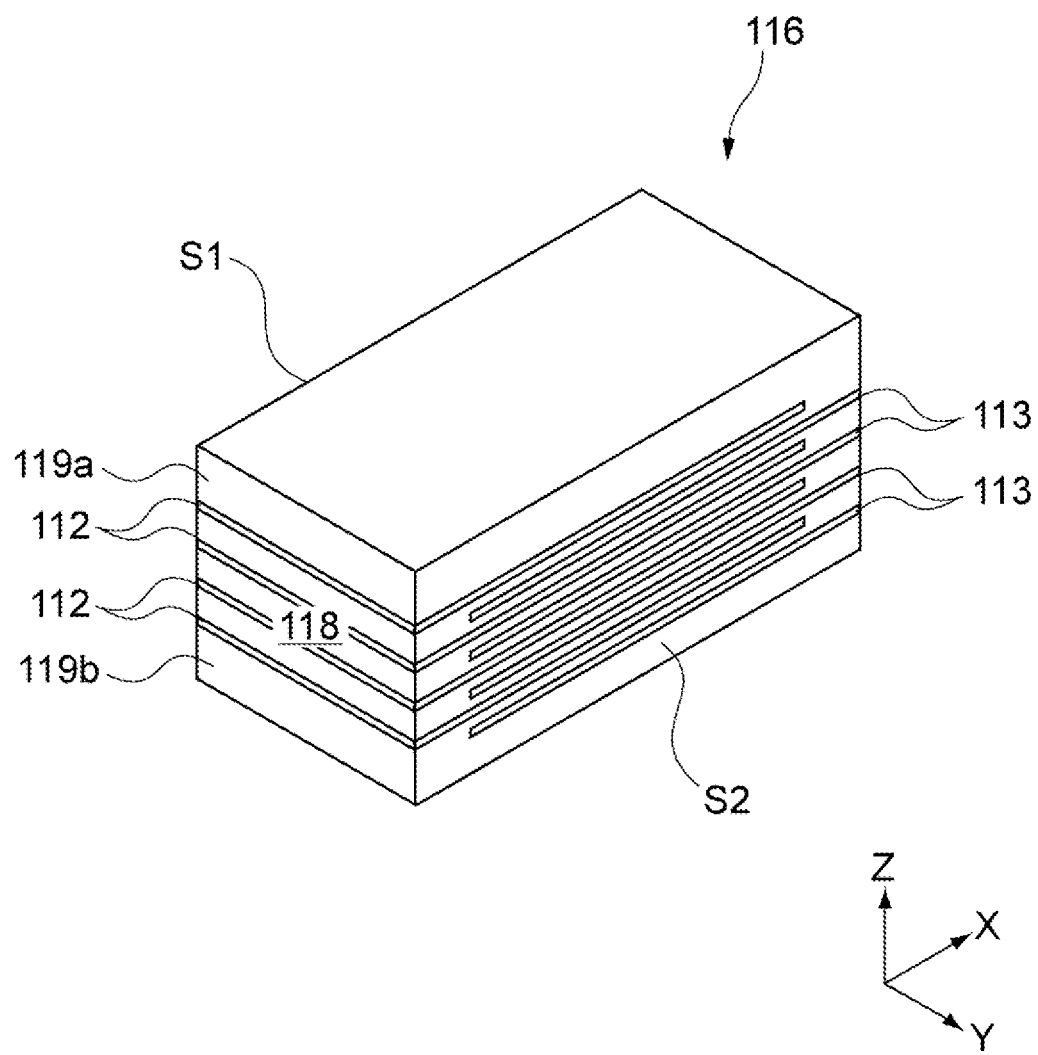
FIG. 6 is a perspective view of an unfired laminate obtained in step S11.

As shown in FIG. 6, the laminate 116 includes an unfired capacitor forming portion 118 having unfired internal electrodes 112 and 113 therein, an unfired first cover portion 119a, and an unfired second cover portion 119b. The laminate 116 has a first side surface S1 and a second side surface S2 orthogonal to the y-axis direction, a first end face and a second end face orthogonal to the x-axis direction, and a first principal surface and a second principal surface orthogonal to the z-axis direction. The first side surface S1 and the second side surface S2 are cutting surfaces corresponding to the cutting lines Lx. The first end face and the second end face are cutting surfaces corresponding to the cutting lines Ly. Side edges of the unfired internal electrodes 112 and 113 are exposed from the first side surface S1 and the second side surface S2, respectively.

(Step S12: Formation of Side Margins)

Figure 7:
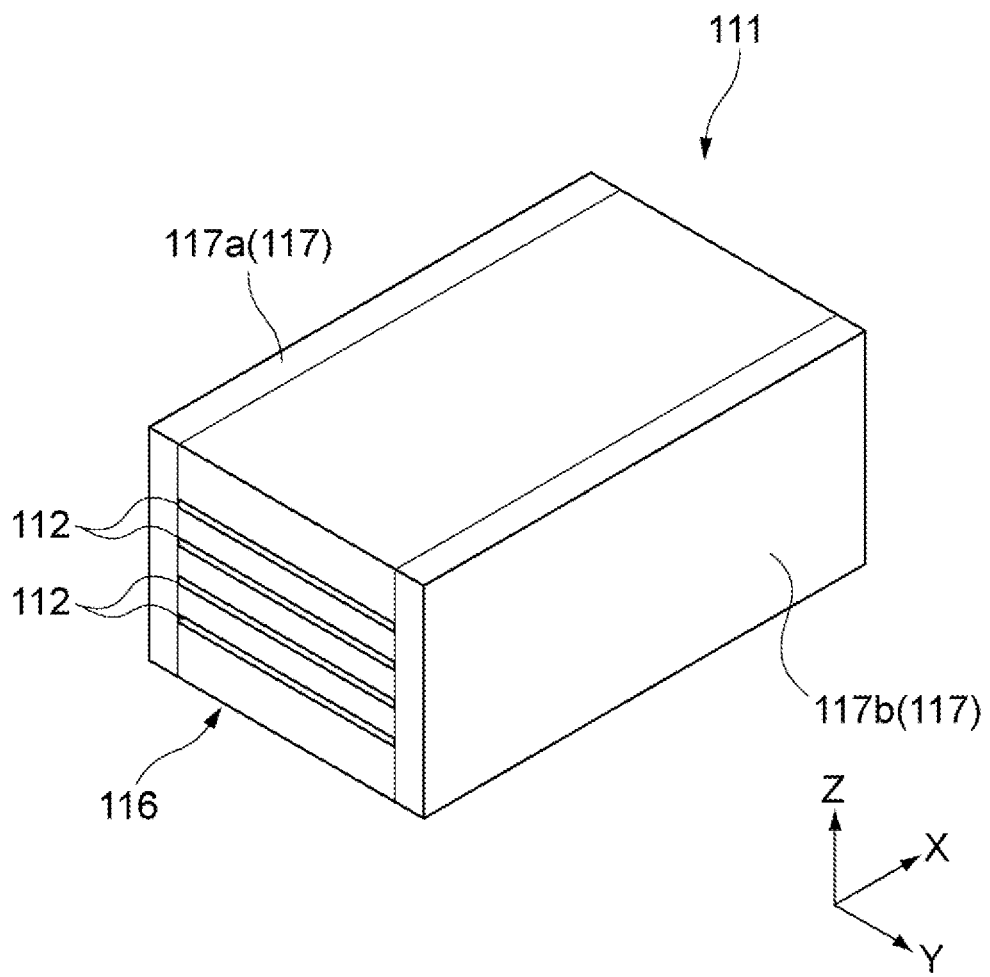
FIG. 7 is a perspective view of an unfired ceramic main body obtained in step S12.

In step S12, unfired first and second side margin portions 117a and 117b are provided on the first and second side surfaces S1 and S2 of the laminate 116 obtained in step S11. As a result, as shown in FIG. 7, the first and second side surfaces S1 and S2 where the internal electrodes 112 and 113 are exposed are covered with the first and second side margin portions 117a and 117b, respectively. In the following description, when there is no need to distinguish between the first and second side margin portions 117a and 117b, each of these will be referred to as a "side margin portion 117".

Figure 8:
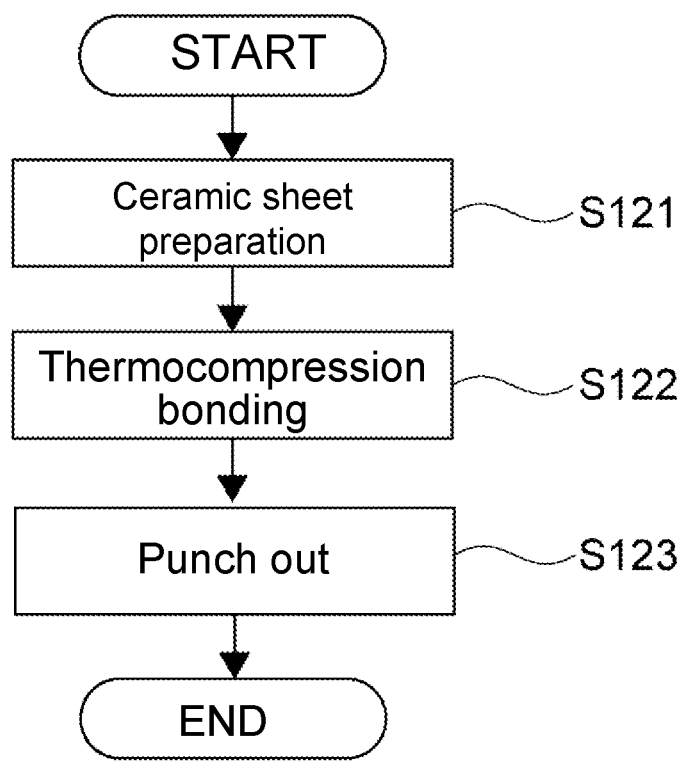
FIG. 8 is a flowchart showing a process of forming side margin portions in step S12.

FIG. 8 is a flow chart showing a process of forming the side margin portions 117 in this embodiment, which is performed in step S12. FIGS. 9 to 11C are diagrams for explaining the process of forming the side margin portion 117. The process for forming the side margin portion 117 will be described below along FIG. 8 with reference to FIGS. 9 to 11C as appropriate.

FIGS. 9 to 11C and the description thereof show an example in which the side margin portion 117 (first side margin portion 117a) is formed on the first side surface S1. By repeating the same process, a side margin portion 117 (second side margin portion 117b) is also formed on the second side surface S2.

(Step S121: Ceramic Sheet Preparation)

In step S121, ceramic sheets 117s for forming side margin portions 117 are prepared. The ceramic sheet 117s is an unfired dielectric green sheet, like the ceramic sheets 101, 102 and 103 prepared in step S11.

First, the materials for the ceramic sheet 117s are mixed to obtain a slurry. The materials of the ceramic sheet 117s include a dielectric ceramic powder, a binder resin, an organic solvent, and additives such as a plasticizer. The slurry obtained by mixing these materials with a ball mill or the like is formed into a sheet using a roll coater, a doctor blade, or the like.

The ceramic sheet 117s of the present embodiment contains 1.5 to 4.0 times more binder resin than the conventional ceramic sheet. Specifically, the blending amount of the binder resin is 10% by mass or more, preferably 13% by mass or more, with respect to the mass of the entire materials being 100% by mass.

The binder resin may be a thermoplastic resin that is generally used as a binder resin for ceramic green sheets. Specifically, the binder resin used for the ceramic sheet 117s may be at least one of cellulose-based resin such as ethyl cellulose, vinyl-based resin such as polyvinyl butyral-based resin and polyvinyl alcohol, acrylic-based resin such as methyl methacrylate-based copolymer, and urethane-based resin, etc. Among these, a polyvinyl butyral-based resin can be used from the viewpoint of obtaining high adhesiveness.

Figure 9:
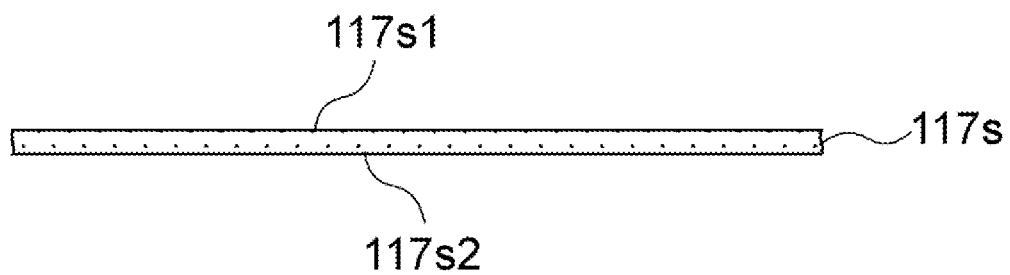
FIG. 9 is a cross-sectional view of the ceramic sheet obtained in step S121.

This way, a ceramic sheet 117s as shown in FIG. 9 is formed. The ceramic sheet 117s has a first surface 117s1 and a second surface 117s2 opposite thereto. The ceramic sheet 117s exhibits adhesiveness due to the binder resin when heated to a predetermined temperature or higher. Since the binder resin is uniformly contained in the ceramic sheet 117s, there is almost no difference in adhesiveness between the first surface 117s1 and the second surface 117s2.

(Step S122: Thermocompression Bonding)

Figure 10A:
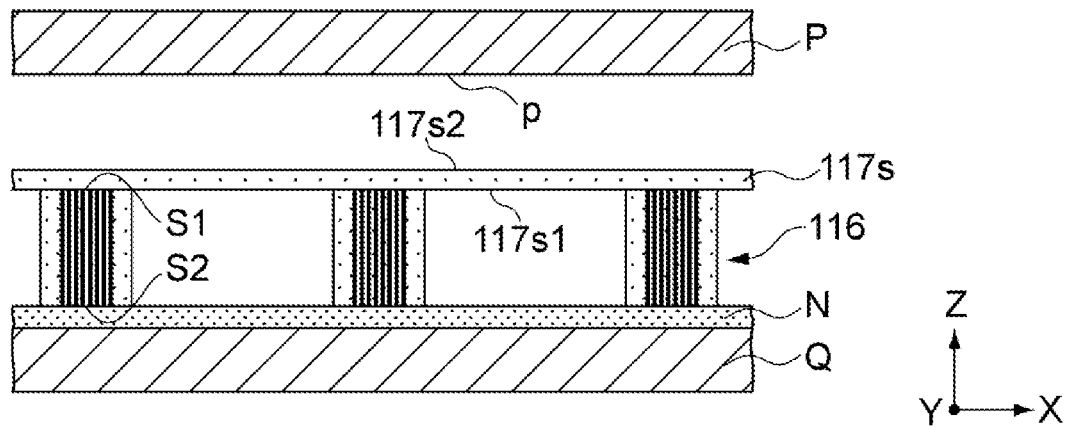
FIG. 10A is a diagram showing the process of step S122.
Figure 10B:
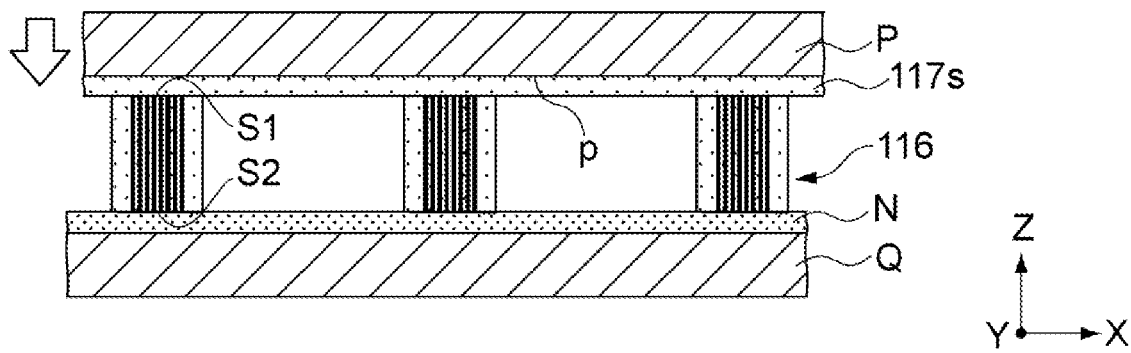
FIG. 10B is a diagram showing the process of step S122.
Figure 10C:
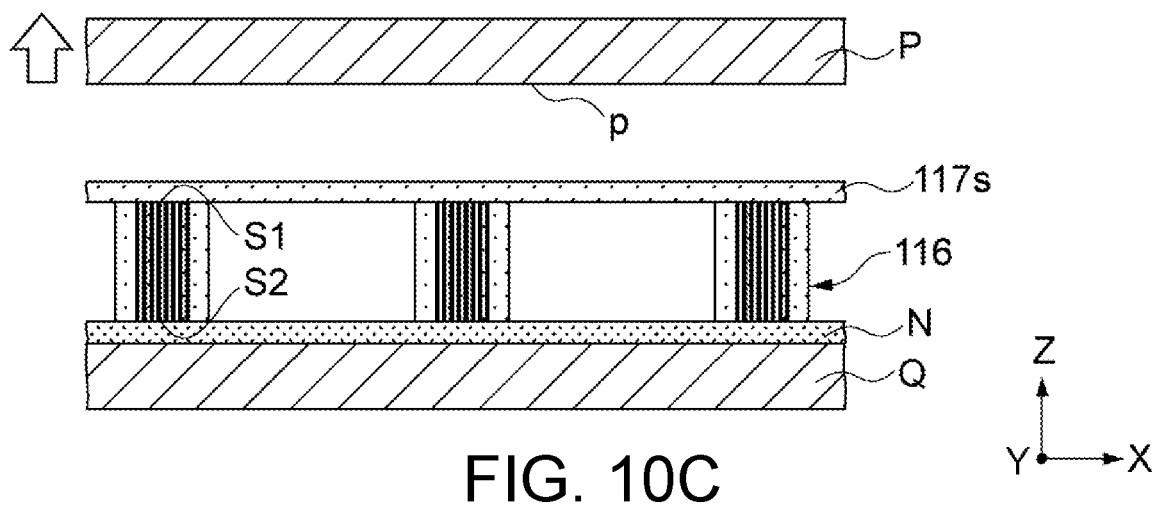
FIG. 10C is a diagram showing the process of step S122.

In step S122, the ceramic sheet 117s is heated and pressure bonded to the first side surface S1 of the laminate 116. FIGS. 10A to 10C are diagrams showing the process of step S122. It should be noted that the drawings and explanations after FIG. 10A mainly refer to the X-axis and Y-axis indicating the horizontal direction and the Z-axis indicating the vertical direction.

First, as shown in FIG. 10A, a plurality of laminates 116 are prepared with the first side face S1 facing upward in the Z-axis direction. The plurality of laminates 116 are spaced apart on the XY plane. In the example shown in FIG. 10A, the second side surfaces S2 of these laminates 116 are held by an adhesive sheet N extending along the XY plane. The adhesive sheet N is arranged on the holding plate Q, for example. By using the adhesive sheet N, the posture and arrangement of the laminates 116 can be stably maintained.

Then, as shown in FIG. 10A, the ceramic sheets 117s prepared in step S121 are arranged on the first side faces S1 of the multiple laminates 116. The surface of the ceramic sheet 117s in contact with the first side surface S1 may be the first surface 117s1 as shown in FIG. 10A, or may be the second surface 117s2.

A heating plate P is arranged above the ceramic sheet 117s in the Z-axis direction. The heating plate P is, for example, a plate-shaped member extending along the XY plane, and includes a pressing surface p and a heat-generating component (not shown) capable of heating the pressing surface p.

Next, as shown in FIG. 10B, the heating plate P is moved downward in the Z-axis direction to bring the pressing surface p into contact with the ceramic sheet 117s. Then, the heated pressing surface p presses the ceramic sheet 117s. This way, the ceramic sheet 117s can be pressure bonded to the first side surface S1 of the laminate 116 while applying heat to the ceramic sheet 117s.

The temperature of the ceramic sheet 117s during the pressure bonding is preferably higher than the glass transition temperature of the binder resin. As a result, the binder resin exhibits fluidity, and the ceramic sheet 117s exhibits sufficient adhesiveness. Although the specific temperature of the ceramic sheet 117s can be appropriately set depending on the type of binder resin, it is, for example, 50° C. or higher and 150° C. or lower. This temperature can be controlled by the power provided to the heating plate P. Also, the pressing time of the ceramic sheet 117s by the pressing surface p can be set, for example, within a range of 1 second or more and 30 seconds or less.

Subsequently, as shown in FIG. 10C, the heating plate P is moved upward in the Z-axis direction to be separated from the ceramic sheet 117s. When cooled in this state, the ceramic sheet 117s adheres to the first side surface S1.

(Step S123: Punching)

Figure 11A:
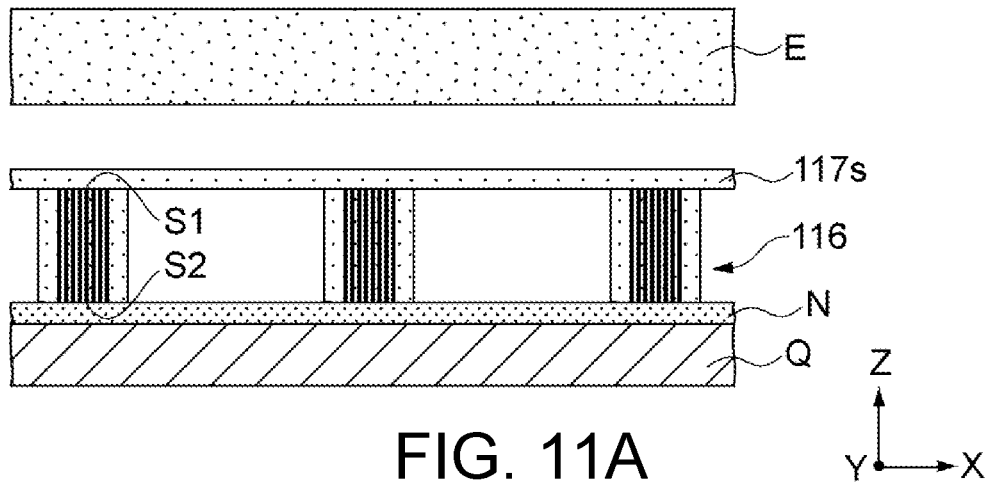
FIG. 11A is a diagram showing the process of step S123.
Figure 11B:
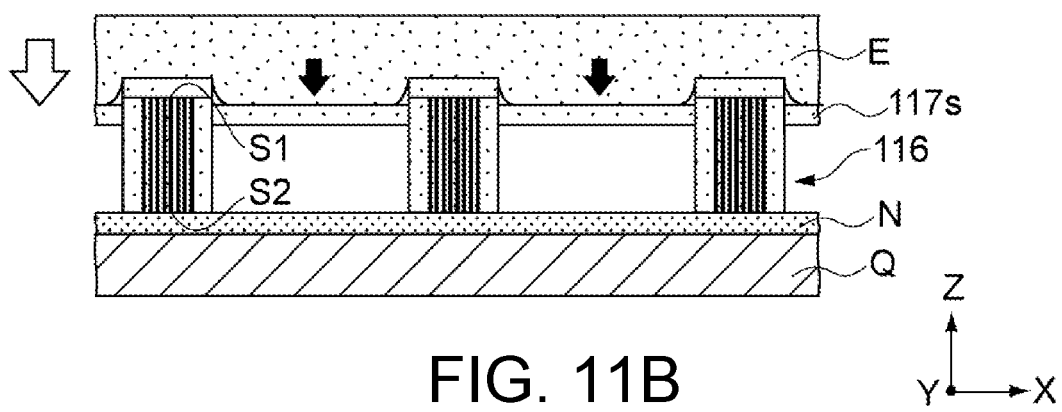
FIG. 11B is a diagram showing the process of step S123.
Figure 11C:
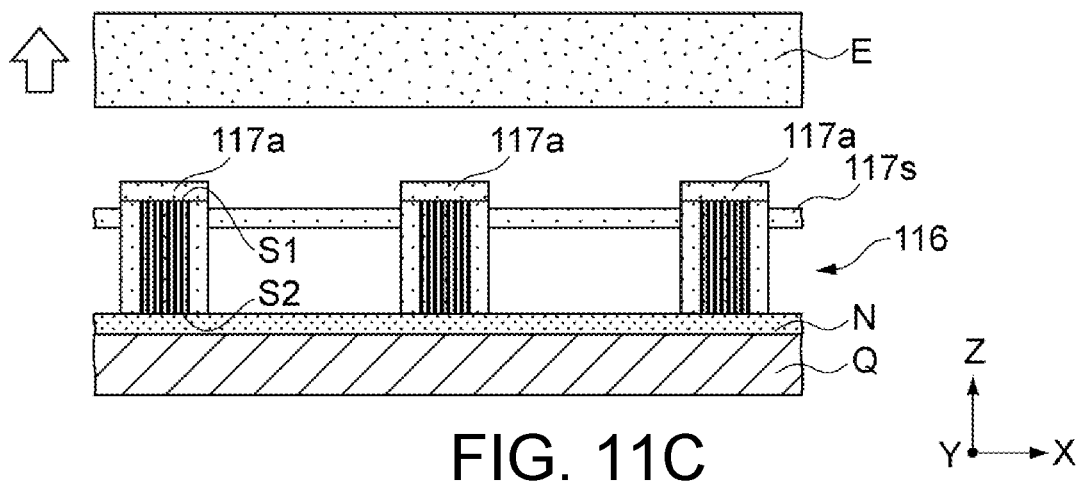
FIG. 11C is a diagram showing the process of step S123.

In step S123, the ceramic sheet 117s that has been thermocompression bonded in step S122 is punched out from the first side surface S1 of the laminate 116. FIGS. 11A to 11C are diagrams showing the process of step S123. In step S123, a plate-shaped elastic member E that extends along the XY plane is used.

In step S123, first, as shown in FIG. 11A, the elastic member E is arranged above the ceramic sheet 117s in the Z-axis direction. Next, as shown in FIG. 11B, the elastic member E is moved downward in the Z-axis direction until it contacts the ceramic sheet 117s, and the elastic member E pushes the ceramic sheet 117s downward in the Z-axis direction.

At this time, the elastic member E enters into the spaces between the multiple laminates 116, thereby pushing down the area of the ceramic sheet 117s that is not held by the first side surfaces S1 of the laminates 116 in the Z-axis direction. This way, the ceramic sheet 117s is cut along the contour of the first side surface S1 of each laminate 116 by a shear force applied in the Z-axis direction.

Thereafter, as shown in FIG. 11C, by moving the elastic member E upward in the Z-axis direction, the elastic member E is separated from the ceramic sheet 117s. At this time, the ceramic sheet 117s remaining on the first side surface S1 of each laminate 116 becomes the first side margin portion 117a. The ceramic sheets 117s remaining in the spaces between the multiple laminates 116 are removed.

Further, steps S121 to S123 are also performed for the second side surface S2 to form the second side margin portion 117b. As a result, the unfired ceramic main body 111 shown in FIG. 7 is formed.

In the method of forming the side margin portions 117 according to the present embodiment, the ceramic sheets 117s containing 10% by mass or more of the binder resin are used. As a result, even if the ceramic sheet 117s is not coated with an adhesive, the ceramic sheet 117s can exhibit adhesiveness by heating.

On the other hand, when the ceramic main body 111 having such side margin portions 117 is subjected to a binder removal treatment, the binder resin contained in the side margin portions 117 develops adhesiveness, and there is a possibility that the side margin portions 117 of different ceramic main bodies 111 may be sticked to each other. Therefore, in the present embodiment, a first heat treatment in step S13 is performed before a second heat treatment (step S14), which corresponds to the binder removal treatment.

(Step S13: First Heat Treatment)

In step S13, a portion of the binder resin in the side margin portions 117 is removed by heating the plurality of unfired ceramic main bodies 111 in a first condition. As a result, the content of the binder resin in the side margin portions 117 can be reduced, and it is possible to prevent the side margin portions 117 from exhibiting adhesiveness in the second heat treatment in the next step S14.

Here, "condition" in heat treatment refer to heating temperature, heating equipment, and heating time. In this embodiment, the first condition for the heat treatment in step S13 is different from the second condition for the heat treatment in step S14. In this case, the first condition differs from the second condition in at least one of heating temperature, heating equipment, and heating time.

Figure 12:
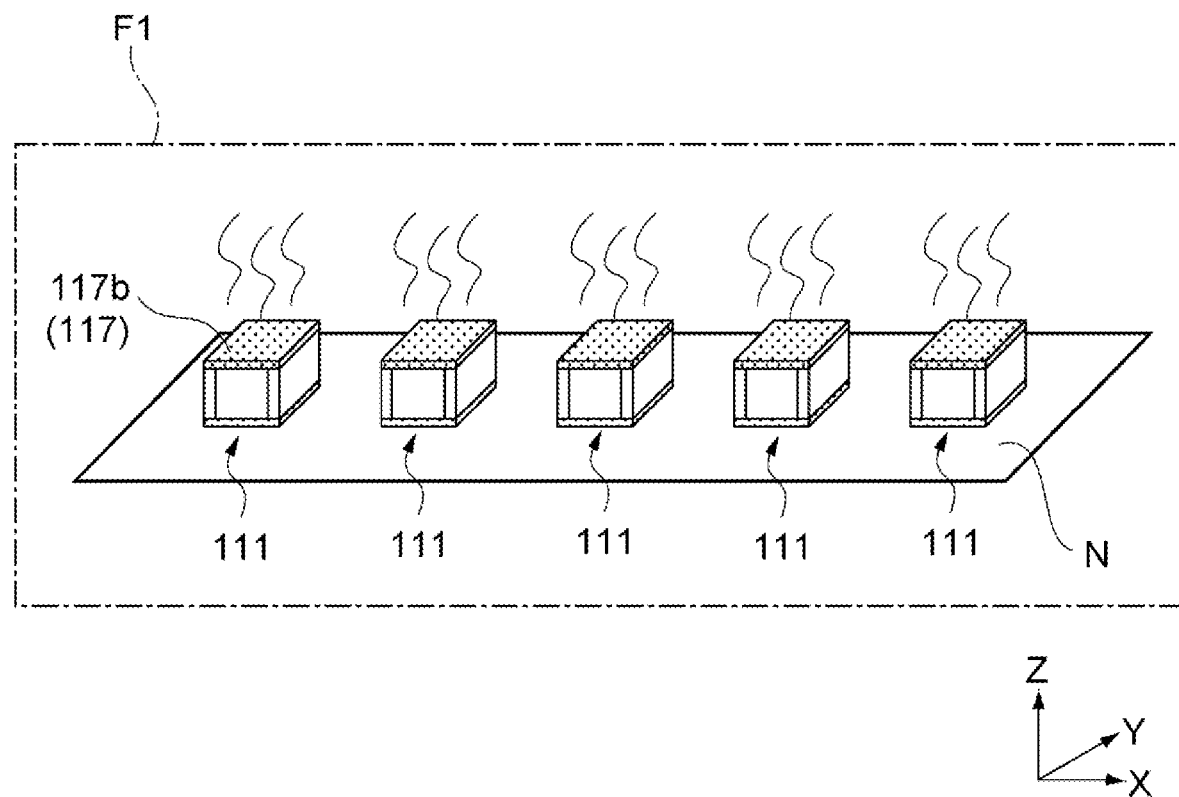
FIG. 12 is a perspective view showing the process of step S13.

FIG. 12 is a schematic perspective view explaining the first heat treatment in step S13 in this embodiment. In the perspective drawings in FIG. 12 and thereafter, the side margin portion 117 is indicated by a dot pattern for the sake of explanation.

In the example shown in FIG. 12, as the first condition, part of the binder resin is removed at a first temperature lower than the second heat treatment in step S14. The first temperature is, for example, a temperature below the transition temperature of the binder resin and at which the binder resin can be thermally decomposed an example of which is 110° C. or higher and 180° C. or lower. By heating the ceramic main body 111 at the first temperature, the binder resin in the side margin portions 117 is thermally decomposed and evaporated. A wavy line in FIG. 12 schematically indicates the volatilized binder resin.

Although the heating equipment is not particularly limited, for example, a furnace capable of heating a closed space or a heating device capable of heating an open space can be used. In the example shown in FIG. 12, a furnace F1 is used to efficiently heat the space.

The heating time can be, for example, 30 minutes or more and 20 hours or less. As a result, the thermal decomposition of the binder resin can be promoted even at a low temperature at which the adhesiveness of the binder resin does not develop.

The heat treatment in this step may be performed in a state where the ceramic main bodies 111 re arranged on the adhesive sheet N used in the step of forming the side margin portions 117, as shown in FIG. 12. As a result, the side margin portion 117 (the second side margin portion 117b in the example of FIG. 12) faces upward in the Z-axis direction, and volatilization of the binder resin can be promoted. In addition, since the ceramic main bodies 111 are arranged on the XY plane with spaces therebetween, it is possible to reliably suppress adhesion between the side margin portions 117 in this step.

When the adhesive sheet N is used, for example, after the first heat treatment is performed with the second side margin portions 117b facing upward in the Z-axis direction, the adhesive sheet N may be removed from the bottom and may be re-attached to the second side margin portions 117b so that the first side margin portions 117a now faces upward in the Z-axis direction, and the first heat treatment may be performed again in that state. In this case, the amount of binder resin is more effectively reduced in both the first and second side margin portions 117a and 117b, and the development of adhesiveness in step S14 can be more effectively suppressed.

Note that the first heat treatment may be performed only in a state in which one of the side margin portions 117 faces upward in the Z-axis direction without reattaching the adhesive sheet N. Even with such one-time first heat treatment, since this reduces the amount of the binder resin in one of the side margin portions 117, adhesion of the side margin portions 117 of different ceramic main bodies 111 in step S14 can be suppressed.

The arrangement of the ceramic main bodies 111 in this step is not limited to the above example. For example, a plurality of ceramic main bodies 111 may be arranged randomly on a tray or the like. Even in this case, by setting the first temperature below the transition temperature of the binder resin, it is possible to remove a portion of the binder resin while suppressing adhesion between the side margin portions 117.

After the first heat treatment in this step and before the second heat treatment, the unfired ceramic main body 111 may be barrel-polished. In this process, the corners of the ceramic main body 111 can be rounded, and problems such as chipping of the corners can be suppressed. In barrel polishing, for example, a plurality of ceramic main bodies 111 are placed in a barrel container together with polishing media, and the barrel container is rotated. By using a liquid such as water as a polishing medium, damage to the unfired ceramic main bodies 111 during polishing can be suppressed.

(Step S14: Second Heat Treatment)

In step S14, the remaining binder resin is removed by heating the plurality of ceramic main bodies 111 in a second condition different from the first condition. In the present embodiment, the second heat treatment in this step corresponds to the binder removal treatment. In this embodiment, as the second condition, a second temperature higher than the first temperature of the first condition is applied.

Figure 13:
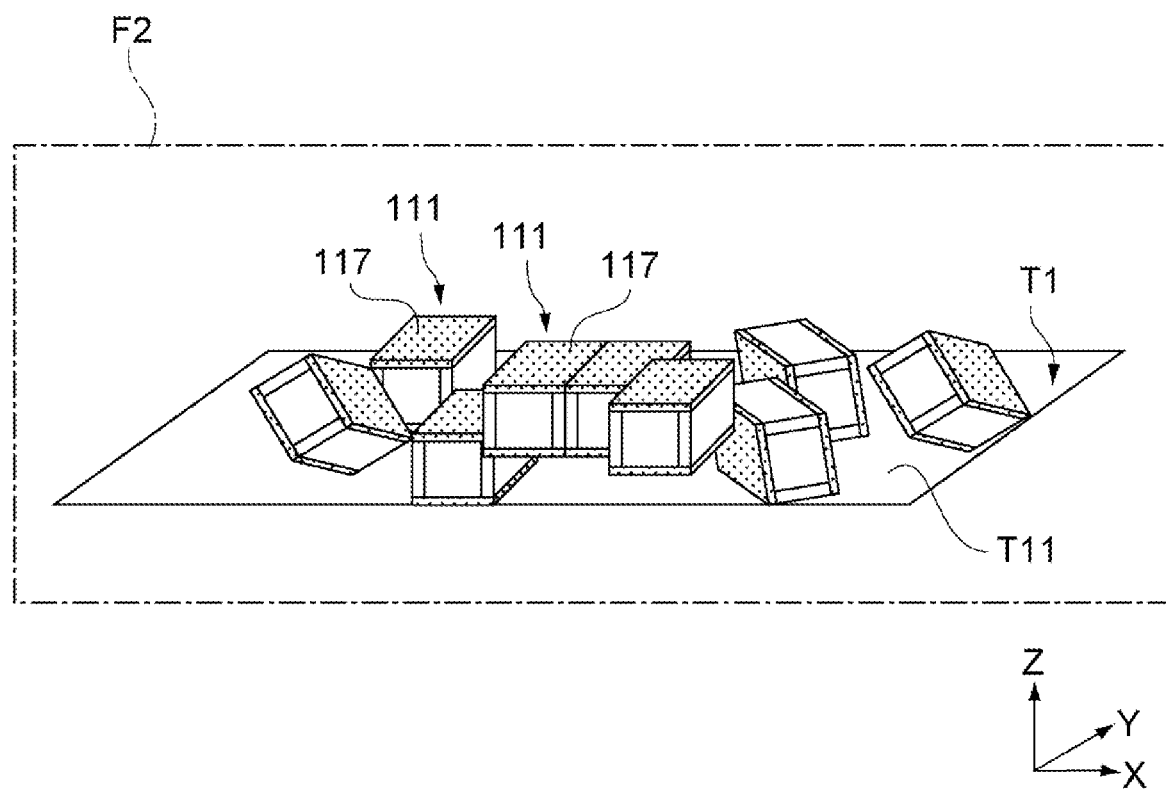
FIG. 13 is a perspective view showing the process of step S14.

FIG. 13 is a diagram showing an example of the second heat treatment in step S14 in this embodiment.

In the example shown in FIG. 13, first, the unfired ceramic main bodies 111 are arranged on the work surface T11 of the work table T1. The work table T1 is made of a material that can withstand the heating in this step, and is a metal or ceramic tray, for example. The work surface T11 is a surface extending along the XY plane. "Extending along the XY plane" refers to a mode of extending along the XY plane as a whole, and includes modes having some unevenness in the Z-axis direction. In some embodiments, the height dimension of the unevenness in the Z-axis direction may be set to 1% or less of the width dimension w (see FIG. 18B) of the ceramic main body 111, which will be described later. In this embodiment, the arrangement of the ceramic main bodies 111 is not particularly limited, and may be arranged randomly as shown in FIG. 13.

Subsequently, the work table T1 on which the ceramic element bodies 111 have been arranged is put into the furnace F2 and heated at the second temperature described above. The second temperature is, for example, the transition temperature of the binder resin or higher, and as a specific example, it can be 200° C. or higher and 400° C. or lower.

As the heating equipment, the furnace F2 capable of heating a closed space can be used in order to efficiently heat the space. The furnace F2 may be the same as or different from the furnace F1 used in step S13. The heating time can be, for example, 20 minutes or more and 50 hours or less.

In step S14, the thermal decomposition of the binder resin can be efficiently promoted by heating the ceramic main bodies 111 at a temperature higher than the transition temperature of the binder resin. As a result, most of the binder resin remaining in the side margin portions 117 and the binder resin contained in the laminate 116 can be removed.

In this embodiment, step S14 is performed after a portion of the binder resin has been removed in step S13. Therefore, when heated in this step, the adhesiveness of the side margin portions 117 is less likely to develop. Therefore, adhesion of the side margin portions 117 of different ceramic main bodies 111 can be suppressed.

(Step S15: External Electrodes Formation)

In step S15, unfired external electrodes are formed by applying a conductive paste to both ends in the X-axis direction of the ceramic main body 11 obtained in step S14. Application of the conductive paste can be performed by a known method such as a dipping method or a printing method.

(Step S16: Firing)

In step S16, the unfired ceramic element body 111 having the external electrodes formed thereon is fired to fabricate the multilayer ceramic capacitor 10 shown in FIGS. 1-3. In other words, the laminate 116 becomes the laminate 16 and the side margin portions 117 become the side margin portions 17 by step S16.

The firing temperature in step S16 can be determined based on the sintering temperature of the ceramic main body 111. For example, when using a barium titanate ($BaTiO_3$)-based material, the firing temperature can be about 1000° C. to about 1300° C. Also, the firing can be performed in a reducing atmosphere or in a low oxygen partial pressure atmosphere, for example.

After firing, electroplating may be performed using the external electrodes 14 and 15 formed by the baked conductive paste as a base to form one or more of plating films thereon.

This completes the multilayer ceramic capacitor 10. In this manufacturing method, since the side margin portions 117 are formed on the first and second side surfaces S1 and S2 of the laminate 116 where the internal electrodes 112 and 113 are exposed, the positions of the side edges in the Y-axis direction of the plurality of internal electrodes 12 and 13 in the ceramic main body 11 are aligned within a range of 0.5 μm.

Advantages of the Present Embodiment

In the present embodiment, the ceramic sheet 117s used for forming the side margin portions 117 contains a binder resin of 10% by mass or more, so that a process of applying an adhesive to the ceramic sheet 117s or the first and second side surfaces S1 and S2 can be omitted. Hereinafter, the advantages will be described with reference to a comparative example.

Figure 14A:
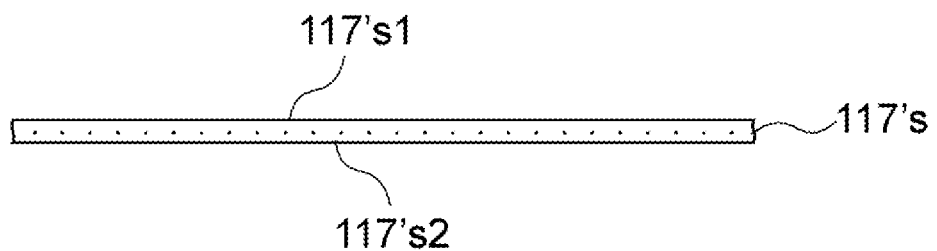
FIG. 14A is a cross-sectional view of a ceramic sheet according to a comparative example.
Figure 14B:
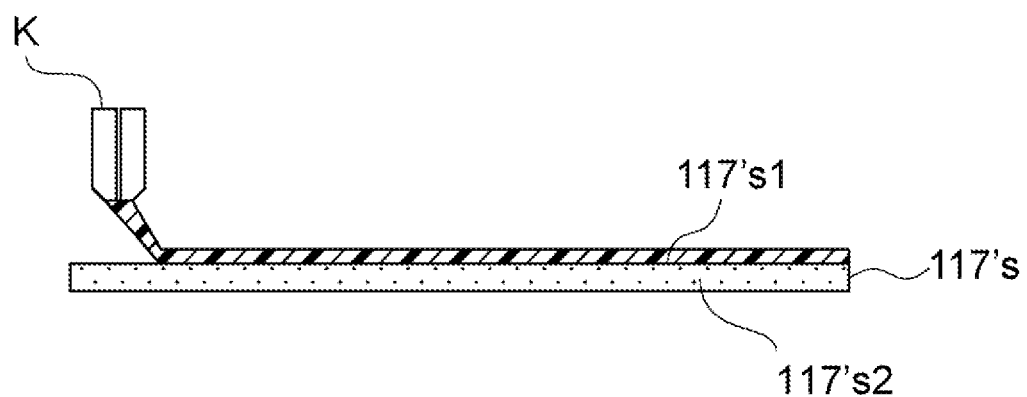
FIG. 14B is a diagram showing a process of applying an adhesive to the above-mentioned ceramic sheet.
Figure 15A:
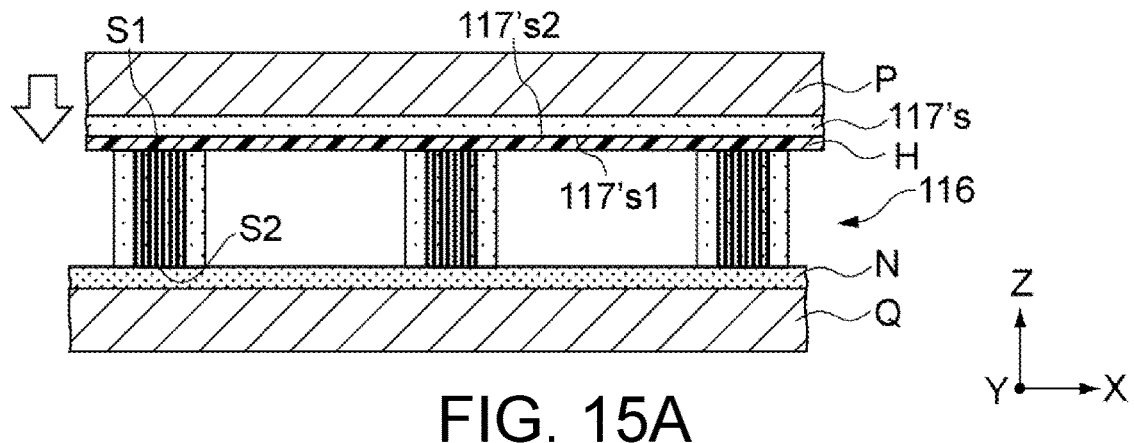
FIG. 15A is a diagram showing a process of forming a side margin portion using the ceramic sheet according to the comparative example.
Figure 15B:
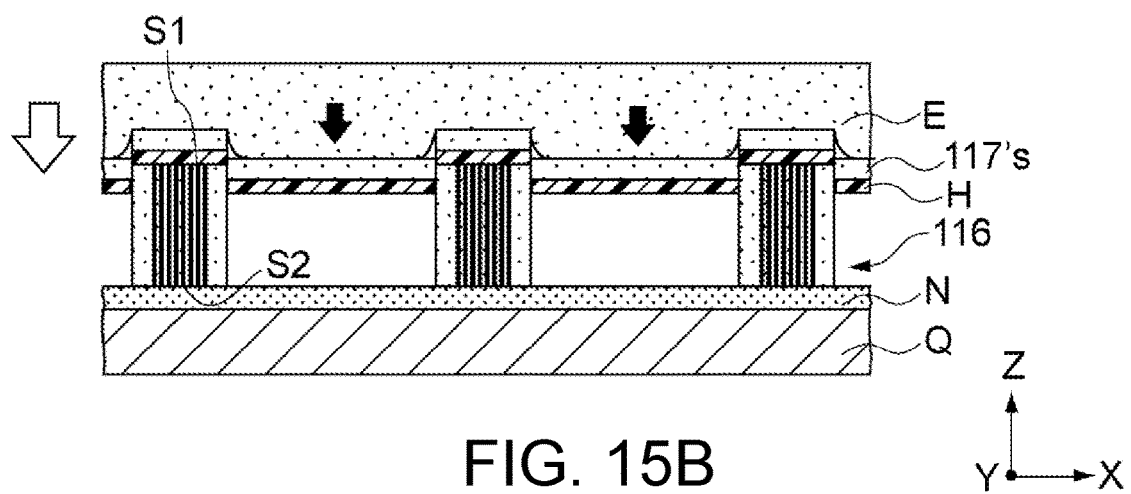
FIG. 15B is a diagram showing the process of forming side margin portions using the ceramic sheet according to the comparative example.
Figure 15C:
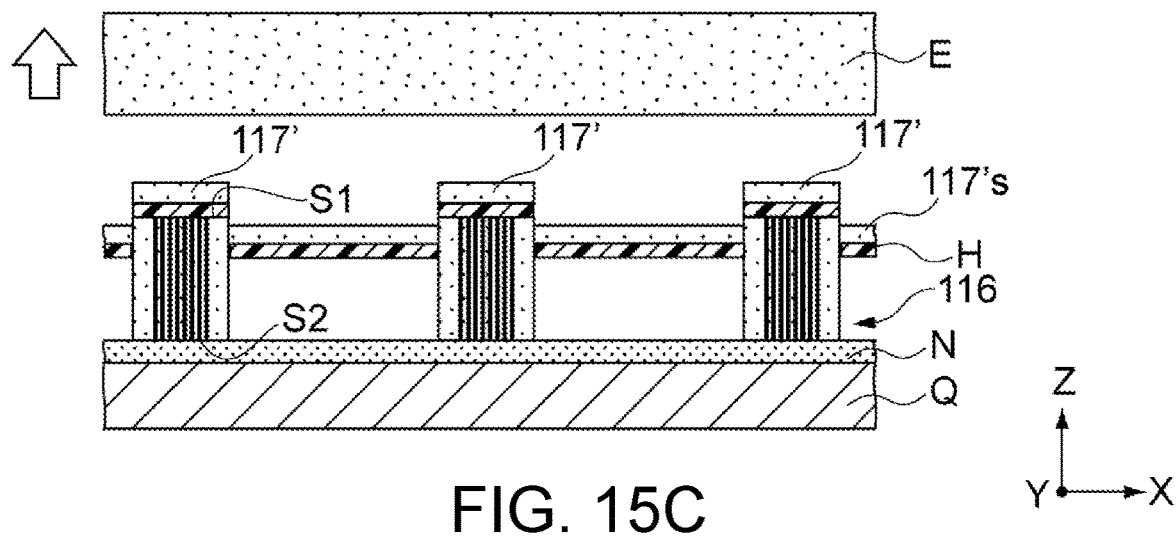
FIG. 15C is a diagram showing the process of forming side margin portions using the ceramic sheet according to the comparative example.

FIGS. 14A and 14B are diagrams showing a preparation process of a ceramic sheet when using an adhesive according to the comparative example, and FIGS. 15A-15C are diagrams showing steps corresponding to steps S121 to S123 in the case of using the ceramic sheet having the adhesive applied thereto.

First, the ceramic sheets 117's are prepared. This ceramic sheet 117's is an unfired dielectric green sheet, like the ceramic sheet 117s prepared in step S121, and contains a dielectric ceramic, a binder resin, and the like. One surface of the ceramic sheet 117's is designated as a first surface 117's1, and the other surface is designated as a second surface 117's2. In this example, the content of the binder resin is 5% by mass or less, and is added mainly for the purpose of moldability or the like. Thus, sufficient adhesiveness won't be exhibited at the time of thermocompression bonding by itself.

Therefore, as shown in FIG. 14B, an adhesive H is applied to the first surface 117's1 of the ceramic sheet 117's. The adhesive H may be, for example, a single component adhesive such as a resin, an adhesive in which a resin is dissolved in a solvent, or a paste in which ceramic particles are dispersed in such an adhesive. The adhesive H is applied using the applicator K to the first surface 117's1 that is facing upward in the Z-axis direction, for example.

Subsequently, as shown in FIG. 15A, the first surface 117's1 of the ceramic sheet 117's coated with the adhesive H is directed downward in the Z-axis direction, and the ceramic sheet 117's is thermocompression bonded to the first side surface S1. This thermocompression bonding can be performed in the same manner as in step S122. However, in order to direct the first surface 117's1, which is the surface to which the adhesive H has been applied, downward in the Z-axis direction, it is necessary to turn the ceramic sheet 117's upside down in the Z-axis direction before the thermocompression bonding.

After the thermocompression bonding, as shown in FIGS. 15B and 15C, the ceramic sheet 117's coated with the adhesive H is punched out by the first side surface S1 in the same manner as in step S123. By performing this thermocompression bonding and punching also on the second side surface S2, it is possible to form a ceramic main body in which the side margin portions 117' are formed on the first and second side surfaces S1 and S2.

By performing the same steps as steps S14 to S16 on this ceramic main body, a structure similar to that of the ceramic main body 11 is obtained. The resin component of the adhesive H is thermally decomposed by the binder removal process. When the adhesive H contains a ceramic component, the ceramic component is integrated with the side margin portion 17.

In contrast to this manufacturing method of the comparative example, in the step of forming the side margin portions 117 in the above-described embodiment, the content of the binder resin in the ceramic sheet 117s is set to 1.5 to 4.0 times the content of the binder resin in the ceramic sheet 117's. As a result, the ceramic sheet 117s alone can exhibit sufficient adhesiveness during thermocompression bonding, and the step of applying an adhesive can be omitted.

Furthermore, in the ceramic sheet 117s of this embodiment, both the first surface 117s1 and the second surface 117s2 have adhesiveness. Therefore, the step of reversing the ceramic sheet 117s in the Z-axis direction before thermocompression bonding can be omitted. As a result, the number of man-hours in the process of forming the side margin portions 117 can be significantly reduced. Also, the material cost of the adhesive can be reduced.

On the other hand, in the present embodiment, if the unfired ceramic main body 111 were subjected to a typical binder removal treatment without performing the first heat treatment, the surface of the side margin portion 117 would possibly become adhesive during the binder removal treatment.

For example, consider the case where the ceramic main bodies 111 that have not been subjected to the first heat treatment are randomly arranged on the work surface T11 of the work table T1 for the second heat treatment, as shown in FIG. 13.

Figure 16A:
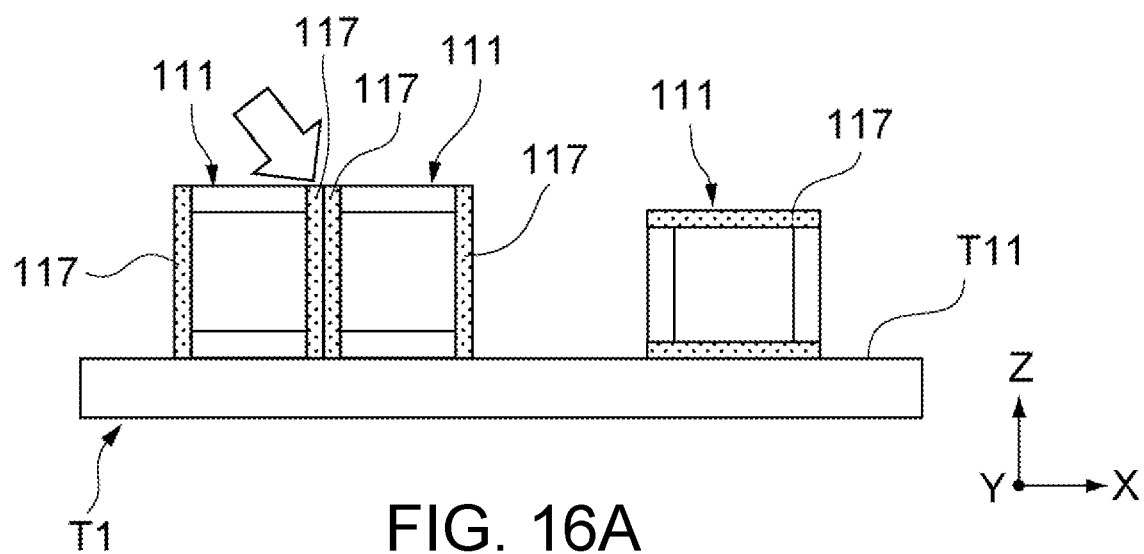
FIG. 16A is a side view for explaining a problem that occurs in step S14 when step S13 is not performed according to another comparative example of the present embodiment.

Then, similarly to step S14, the work table T1 on which the ceramic main bodies 111 have been placed would be put into the furnace F2 and heated to the second temperature described above. Since the second temperature is equal to or higher than the transition temperature of the binder resin, the adhesiveness of the binder resin can develop. Therefore, if the side margin portions 117 of the adjacent ceramic main bodies 111 face each other and come into contact with each other as indicated by the white arrow in FIG. 16A, they are firmly attached to each other.

Figure 16B:
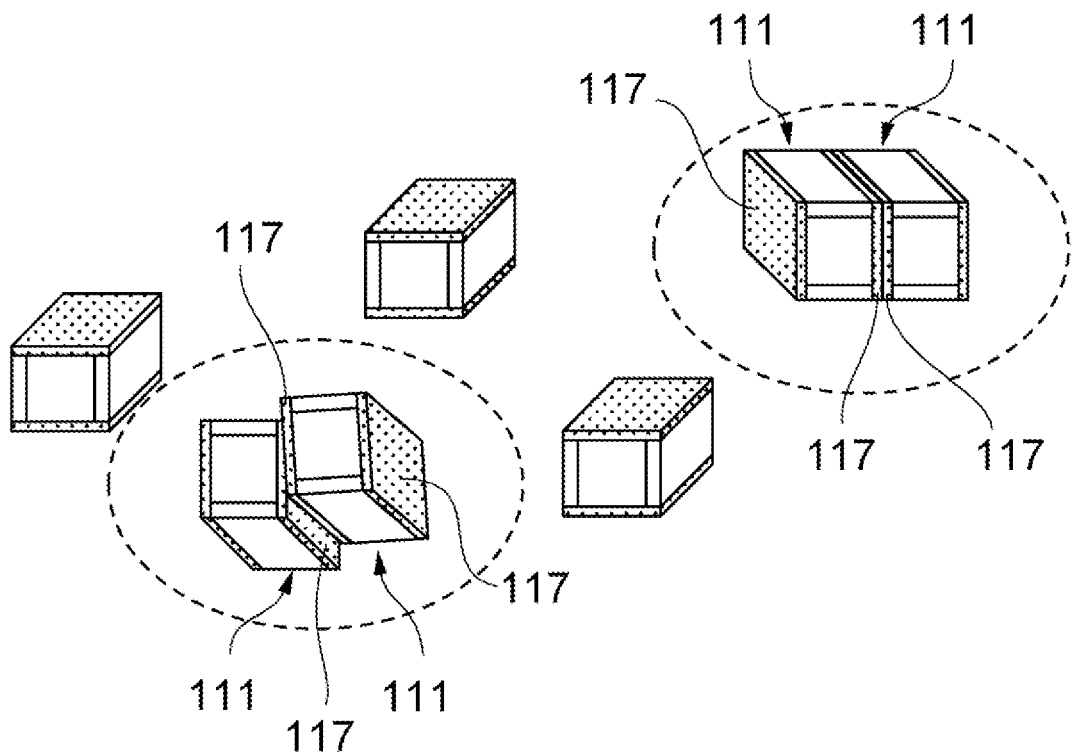
FIG. 16B is a perspective view for explaining the above problem.

When the ceramic main bodies 111 are collected after being heated and cooled thereafter, as shown in the portions enclosed by the broken lines in FIG. 16B, the side margin portions 117 of such two ceramic main bodies 111 are firmly attached together. Especially when the surfaces of the side margin portions 117 that were facing each other are attached together this way, the area of the adhered portion is large. In such a case, even if an external force is applied, they will not separate easily, and they become defective products.

According to the findings of the present inventor, if the second heat treatment is performed at a heating temperature of 200° C. to 400° C. without performing the first heat treatment, among all the ceramic main bodies 111 arranged on the work table T1, about 10% to 40% of them become defective for this reason.

On the other hand, in the present embodiment, a portion of the binder resin contained in the side margin portions 117 is removed by performing the first heat treatment in step S13. Therefore, in the second heat treatment of step S14, the amount of the binder resin in the side margin portions 117 that may develop adhesiveness can be reduced. Thus, it is possible to suppress the problem that the side margin portions 117 of different ceramic main bodies 111 are firmly attached and cannot be separated, from occurring in the processes after step S14.

According to the findings of the present inventor, when the first heat treatment is performed at 110 to 180° C. for 60 minutes and then the second heat treatment is performed at a heating temperature of 200 to 400° C., it is possible to reduce the percentage of such defects to 5% or less among all the ceramic element bodies 111 arranged on the work table T1.

Therefore, according to the present embodiment, the formation efficiency of the side margin portions 117 can be improved, and undesired adhesion of the side margin portions 117 of different ceramic main bodies 111 can be suppressed.

Second Embodiment

In the first embodiment described above, an example of heating the space around the ceramic main bodies 111 was described as the first heat treatment in step S13, but the form of the first heat treatment in step S13 is not limited to this.

In each of the following embodiments, steps similar to those of the first embodiment are denoted by the same reference numerals, and detailed description thereof will be omitted.

Figure 17:
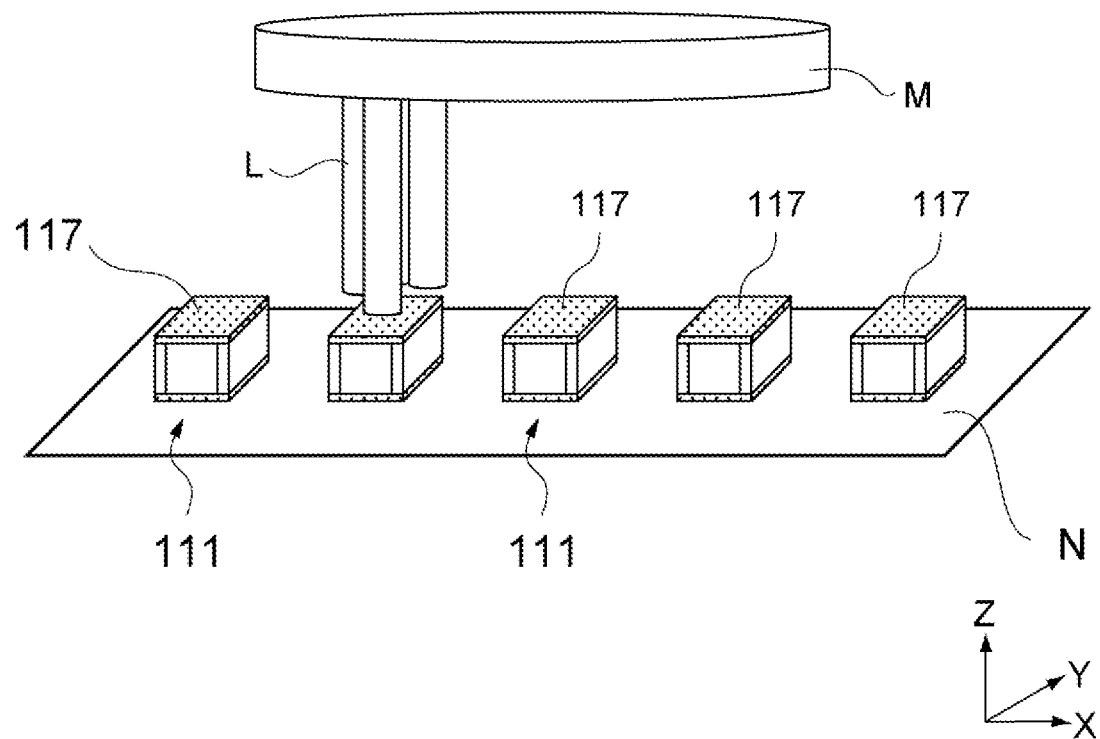
FIG. 17 is a perspective view showing the process of step S13 according to a second embodiment of the present invention.

FIG. 17 is a diagram for explaining a process of the second embodiment, which corresponds to the first heat treatment in step S13.

In this embodiment, at least one of the pair of side margin portions 117 is irradiated with light using a light source to remove a portion of the binder resin therein. In other words, the energy of the light beam locally heats the side margin portion 117 so as to remove the portion of the binder resin.

In this embodiment, light rays refer to ultraviolet rays, visible rays, or infrared rays, having a wavelength in the range of about $10^{-8}$ m or more and about $10^{-3}$ m or less among electromagnetic waves. These rays can deliver thermal energy to the object upon irradiation. Of these, from the viewpoint of efficiently supplying thermal energy to the side margin portions 117 by irradiation, it is preferable to use infrared rays having a wavelength of about $3 \times 10^{-7}$ m or more and about $10^{-3}$ m or less.

The light source here is a source that emits light rays, and includes, for example, lasers, incandescent lamps, and discharge lamps. In the present embodiment, for example, a laser irradiation device L can be used as the light source from the viewpoint of locally and efficiently irradiating the side margin portion 117 with light. The laser is not particularly limited as long as it can emit light capable of heating the side margin portion 117. For example, a semiconductor laser, a YAG laser, an excimer laser, or the like can be appropriately selected.

In the example shown in FIG. 17, the laser irradiation device L irradiates one side margin portion 117 with laser light. From the viewpoint of efficiently heating the plurality of side margin portions 117, the laser irradiation device L may be connected to, for example, a driving device M so as to be movable within the XY plane. Note that the laser irradiation device L may be configured to simultaneously irradiate a plurality of side margin portions 117 with laser light.

The output intensity of the laser light can be appropriately set within a range of, for example, 10 mW to 100 W. The irradiation time of laser light for one side margin portion 117 can be appropriately set according to the wavelength and the output intensity of the laser light, and can be set to 1 to 60 seconds, for example.

According to this embodiment as well, the side margin portion 117 is locally heated by the energy of the light beam, and a portion of the binder resin therein is thermally decomposed. As a result, the portion of the binder resin can be removed in step S13, and attachment of the side margin portions 117 during step S14 can be suppressed. Moreover, since the side margin portion 117 can be locally heated, the influence of heat on the laminate 116, the adhesive sheet N, and the like can be reduced. Furthermore, by adjusting the output intensity of the laser light, the heat treatment in step S13 can be performed for a relatively short time.

It should be noted that, as shown in FIG. 17, the light irradiation in step S13 of this embodiment may be performed in a state where the ceramic main bodies 111 are arranged on the adhesive sheet N, as in the first embodiment. As a result, it is possible to efficiently irradiate the side margin portions 117 with the light beam.

In addition, the irradiation of the light beam/rays may be performed on at least one of the first side margin portion 117a and the second side margin portion 117b, but it is preferable to apply the light beam to both the first and second side margin portions 117a and 117b. Further, the irradiation of the light beam may be performed on only some of the ceramic main bodies 111 on the adhesive sheet N, but it is preferable to irradiate all the ceramic main bodies 111 that are on the adhesive sheet N.

Third Embodiment

In the first embodiment described above, in the second heat treatment in step S14, the plurality of ceramic main bodies 111 are arranged on the work table T1 having the work surface T11. In a third embodiment, by controlling the attitude and arrangement of the ceramic main bodies 111 in the second heat treatment, it is possible to more reliably suppress sticking of the side margin portions 117 during the second heat treatment.

The manufacturing method of the multilayer ceramic capacitor of this embodiment includes steps S11 to S16 as in the first embodiment. However, certain features of the second heat treatment in step S14 are different from that in the first embodiment, as will be described in detail below.

Figure 18A:
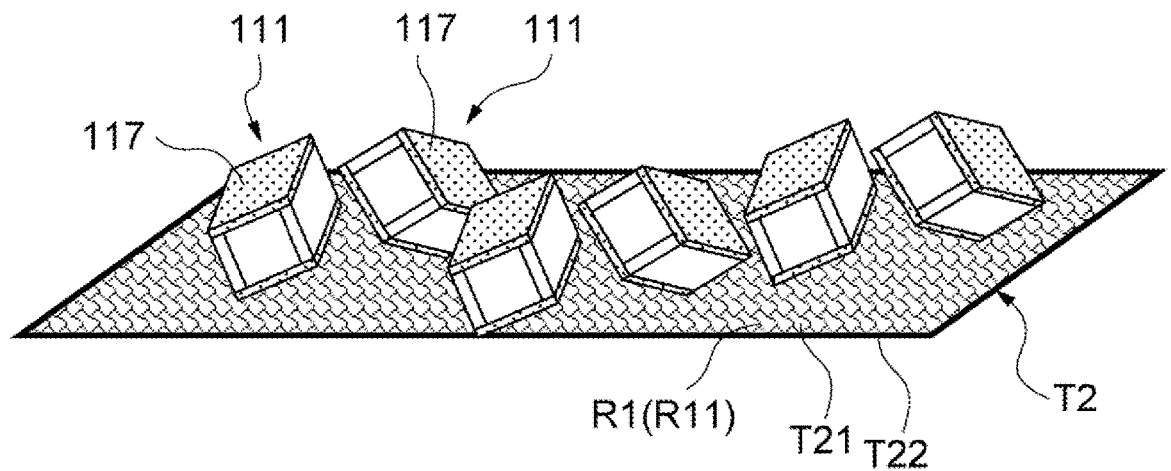
FIG. 18A is a perspective view showing the process of step S14 according to a third embodiment of the present invention.
Figure 18B:
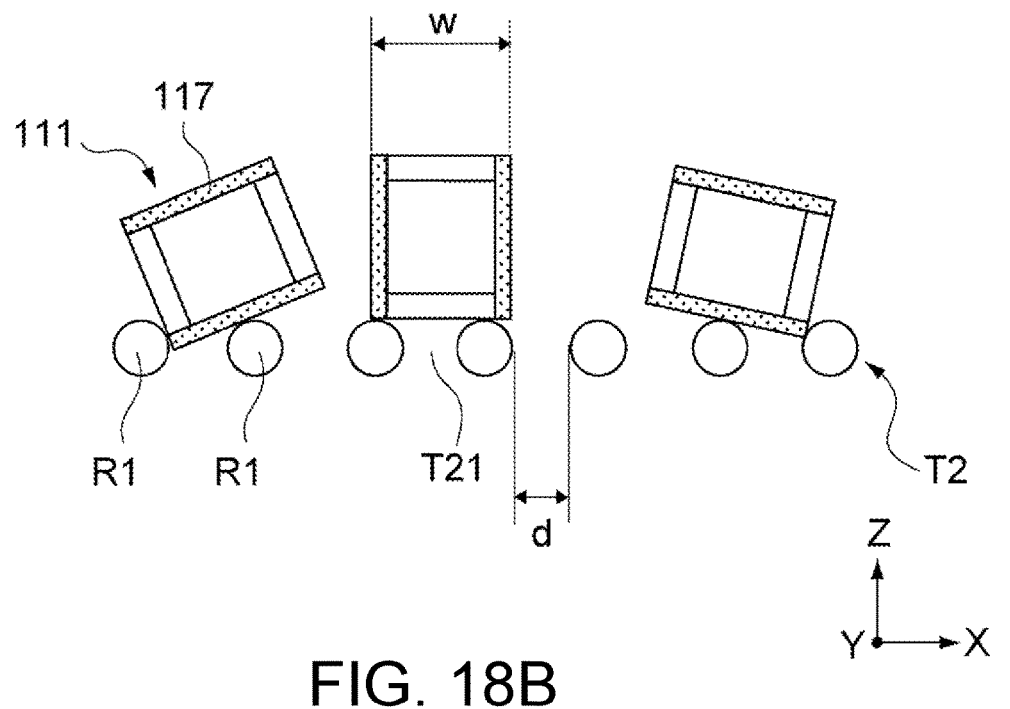
FIG. 18B is a side view showing the process of step S14 according to the third embodiment.

FIGS. 18A and 18B are schematic diagrams explaining the second heat treatment in step S14 in this embodiment. In this embodiment, in step S14, a plurality of unfired ceramic main bodies 111 are heated while an intervening member R1 is disposed between the ceramic main bodies 111 that are arranged on a work table T2 extending along the XY plane.

The intervening member R1 is a member that can be disposed between the plurality of ceramic main bodies 111 arranged on the work table T2 in step S14. The expression "between a plurality of ceramic main bodies 111" means between the ceramic main bodies 111 adjacent to each other on the XY plane as well as between the ceramic main bodies 111 randomly arranged and adjacent to each other in the Z-axis direction. By using the intervening member R1, it is possible to separate the adjacent ceramic main bodies 111 or change the attitude of the adjacent ceramic main bodies 111.

The intervening member R1 can withstand a second temperature (for example, 200-400° C.). From the viewpoint of suppressing deformation due to contact with the ceramic main bodies 111, the intervening member R1 is preferably made of a material generally classified as a rigid body. As a specific example, the intervening member R1 may be made of metal, metal oxide, ceramic material, or the like.

In the example shown in FIG. 18A, the work table T2 is configured as a mesh tray, and the intervening member R1 has a mesh structure. That is, in this example, the work table T2 has the intervening member R1, and the intervening member R1 constitutes a part of the work table T2. From the viewpoint of heat resistance and strength, the work table T2 is preferably made of metal such as aluminum or stainless steel.

As shown in FIG. 18A, the intervening member R1 is formed with a plurality of openings T21 and extends along the XY plane. Further, the work table T2 may have a frame body T22 that supports the peripheral edge of the intervening member R1 in order to increase strength.

As shown in FIG. 18B, the ceramic main body 111 placed on the intervening member R1 can assume an attitude in which the corners and the like enter the opening T21 while being partly supported by the intervening member R1. As a result, at least some of the ceramic main bodies 111 on the work table T2 assume a tilted posture with respect to the XY plane, and the surfaces of the adjacent side margin portions 117 are prevented from facing each other. Therefore, wide area contact between adjacent side margin portions 117 is unlikely to occur, and attachment of side margin portions 117 can be suppressed. In addition, the intervening member R1 and the openings T21 widen the gap between the ceramic main bodies 111, thereby greatly reducing the risk of the adjacent side margin portions 117 coming into contact with each other.

After placing the plurality of ceramic main bodies 111 on the work table T2, the work table T2 is put into a furnace and heated in the same manner as in step S14 (second heat treatment) of the first embodiment. As the heating condition, the second condition described in the first embodiment can be applied.

After heating and cooling, the work table T2 is removed from the furnace. In the present embodiment, since the side margin portions 117 are prevented from facing each other, sticking of the side margin portions 117 during the second heat treatment is more effectively prevented.

The size of the intervening member R1 and the openings T21 can be appropriately adjusted depending on the size of the ceramic main body 111 and the like. Referring to FIG. 18B, the ratio of the spacing d between the adjacent structures of the intervening member R1 to the width dimension w of the ceramic main body 111 is, for example, 5% or more and 80% or less. The ratio of the width dimension of the individual structures constituting the mesh of the intervening member R1 to the width dimension w of the ceramic main body 111 is, for example, 5% or more and 50% or less. Here, the width dimension w of the ceramic main body 111 is the maximum dimension of the ceramic main body 111 in the y-axis direction (the direction in which the pair of side margin portions 117 face each other). The width dimension of the intervening member R1 is the maximum dimension in the direction that is parallel to the XY plane and perpendicular to the longitudinal direction of the individual structure constituting the mesh of the intervening member R1.

As a modification of the present embodiment, the intervening member R1 may be a plate-like member such as a punched out metal sheet in which a plurality of openings T21 are formed. Also in this case, by appropriately setting the shape and density of the openings T21, a portion of the ceramic main body 111 enters the opening T21, and can assume an inclined posture with respect to the XY plane. As a result, the adjacent side margin portions 117 can be prevented from coming into close contact with each other, and the adjacent ceramic main bodies 111 can be separated from each other.

Fourth Embodiment

In a fourth embodiment, an intervening member R2 constitutes a part of a work table T3. That is, the work table T3 has an uneven surface profile due to the intervening member R2.

FIG. 19 is a diagram for explaining step S14 (second heat treatment) in the method for manufacturing a multilayer ceramic capacitor according to this embodiment. The manufacturing method of the multilayer ceramic capacitor of this embodiment includes steps S11 to S16 as in the third embodiment. However, certain features of the second heat treatment in step S14 are different from that in the third embodiment, as will be described in detail below.

Figure 19A:
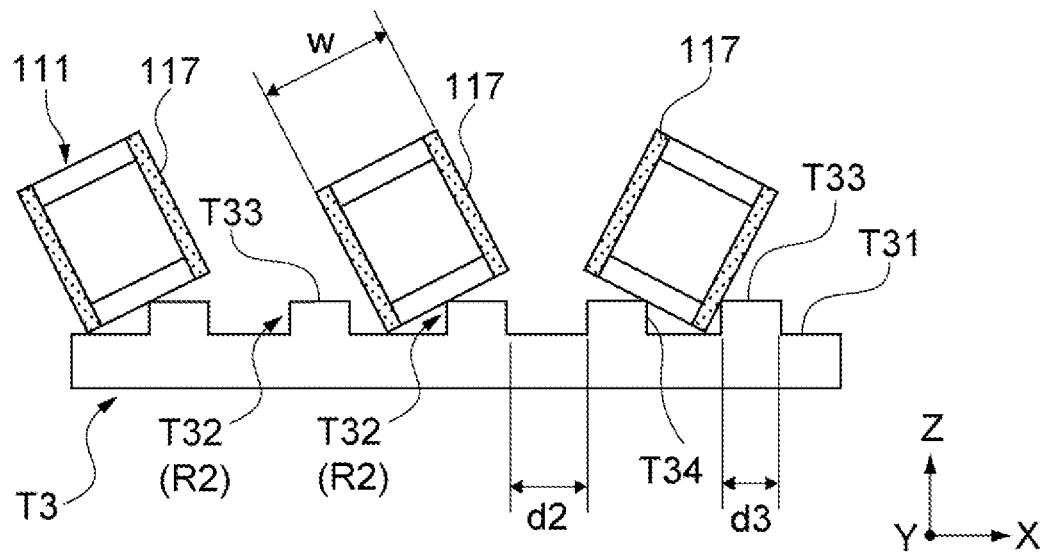
FIG. 19A is a side view showing the process of step S14 according to a fourth embodiment of the present invention.

In the example shown in FIG. 19A, the work table T3 has a surface T31 extending along the XY plane and a plurality of protrusions T32 protruding from the surface T31. The intervening member R2 of the present embodiment is constituted of the plurality of projections T32.

The shape of each protrusion T32 is not particularly limited, and as shown in FIG. 19A, for example, the top portion T33 elevated from the surface T31 in the Z-axis direction may be configured to have a flat surface. Alternatively, the top portion T33 may be configured to have a curved surface. Moreover, the side surface T34 that is connected to the surface T31 of the intervening member R2 may vertically extend in the Z-axis direction or may be inclined from the Z-axis direction.

Also in the present embodiment, the ceramic main body 111 can assume a posture that is randomly tilted with respect to the XY plane. In the example shown in FIG. 19A, the ceramic element body 111 is arranged so that a portion thereof contacts the surface T31 and the other portion contacts the protrusion T32 (the intervening member R2). In addition, due to the uneven structure caused by the protrusions T32 (intervening member R2), the adjacent ceramic main bodies 111 are spaced apart from each other. As a result, the risk of the adjacent side margin portions 117 coming into close contact with each other is greatly reduced. Therefore, also in the this embodiment, sticking of the side margin portions 117 during the second heat treatment in step S14 is more effectively suppressed.

The arrangement and shape of the projections T32 can be appropriately adjusted depending on the size of the ceramic main body 111 and the like. For example, referring to FIG. 19A, the ratio of the interval d2 between the adjacent protrusions T32 to the width dimension w of the ceramic main body 111 is, for example, 5% or more and 70% or less. The interval d2 is the narrowest interval between the adjacent protrusions T32. A ratio of the width dimension d3 of the protrusion T32 to the width dimension w of the ceramic main body 111 is, for example, 5% or more and 70% or less. The width dimension d3 of the projection T32 is the maximum dimension in the direction parallel to the XY plane and orthogonal to the longitudinal direction of the projection T32.

Figure 19B:
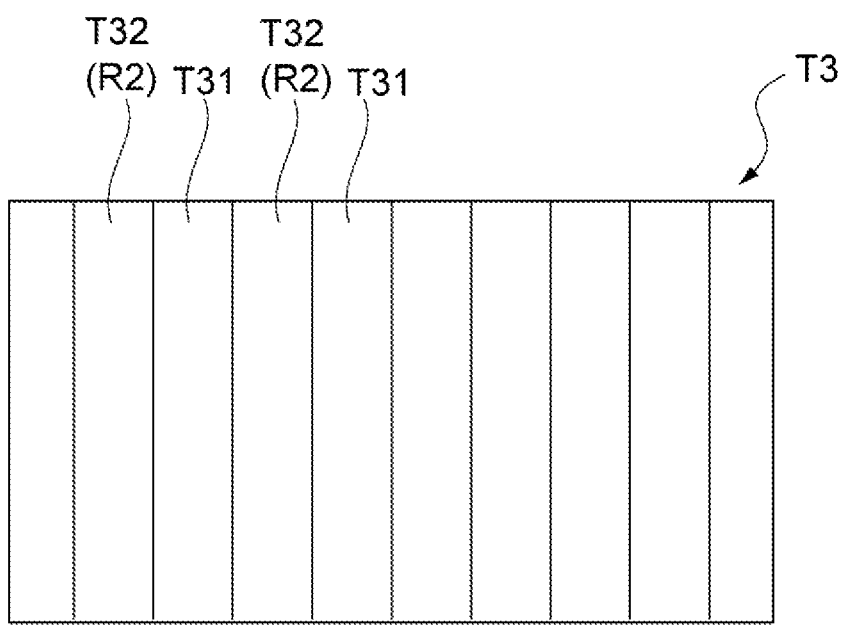
FIG. 19B is a plan view showing a configuration example of a work table used in step S14 according to the fourth embodiment.
Figure 19C:
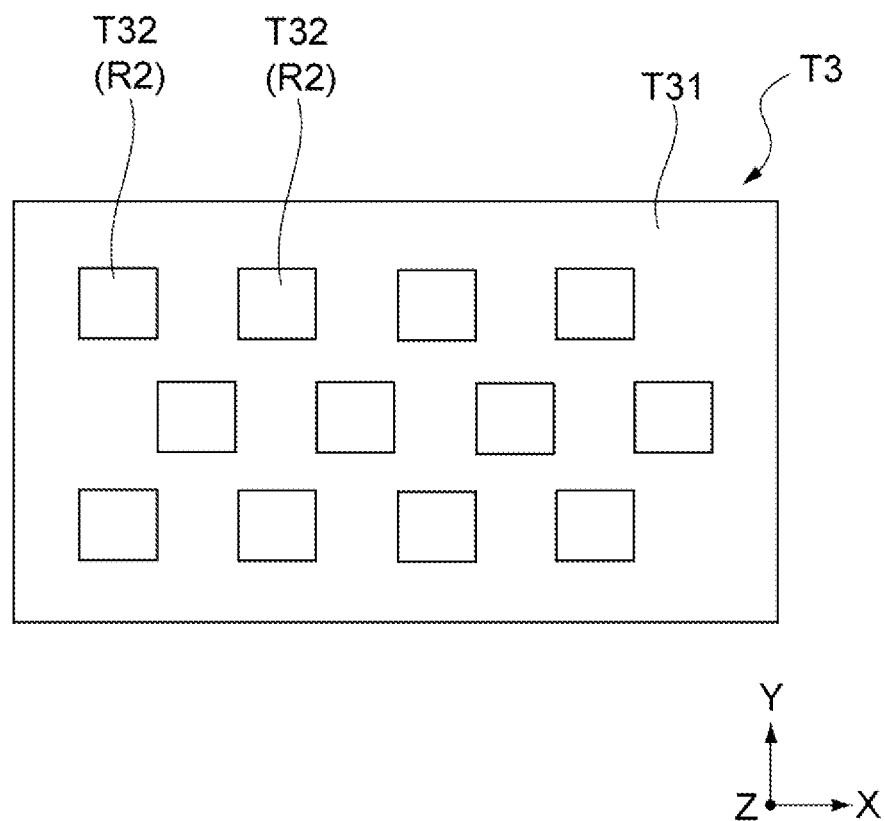
FIG. 19C is a plan view showing another configuration example of the work table.

In the present embodiment, the arrangement and shape of the protrusions T32 (intervening member R2) in a plan view as seen from the Z-axis direction are also not particularly limited. For example, as shown in FIG. 19B, the convex portion T32 may have an elongated shape extending along a predetermined direction (e.g., Y-axis direction) parallel to the XY plane. Alternatively, as shown in FIG. 19C, the protrusions T32 are not limited to an elongated shape, and may be scattered like islands on the surface T31.

Fifth Embodiment

In the third and fourth embodiments, an example in which the intervening member R1/R2 is on or a constituent part of the work table T2/T3 has been described, but the intervening member may be members separate from the work table.

Figure 20A:
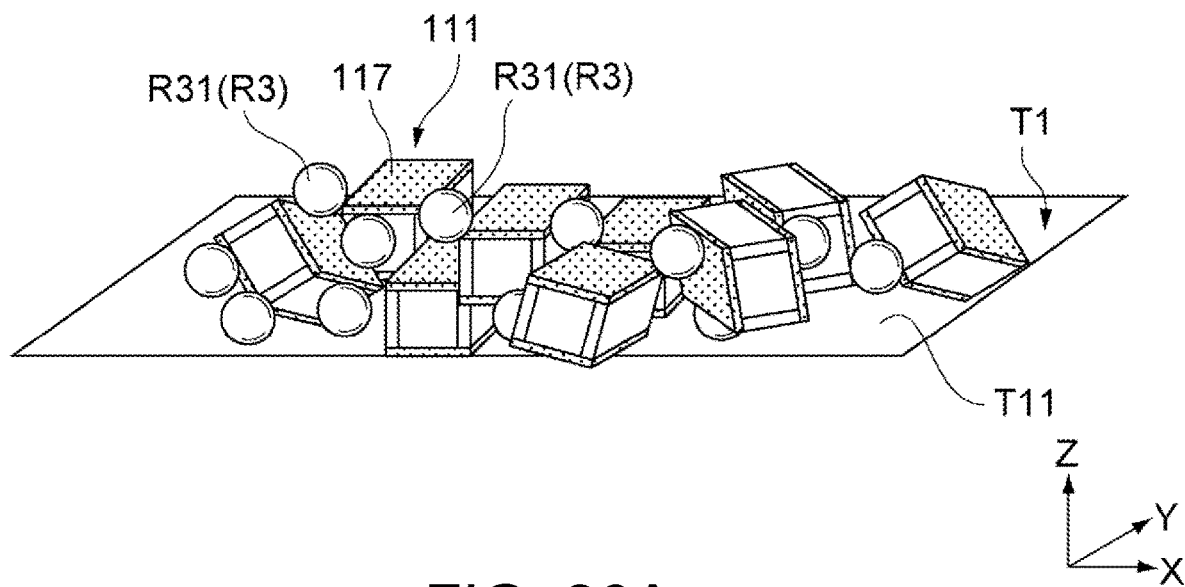
FIG. 20A is a perspective view showing the process of step S14 according to a fifth embodiment of the present invention.
Figure 20B:
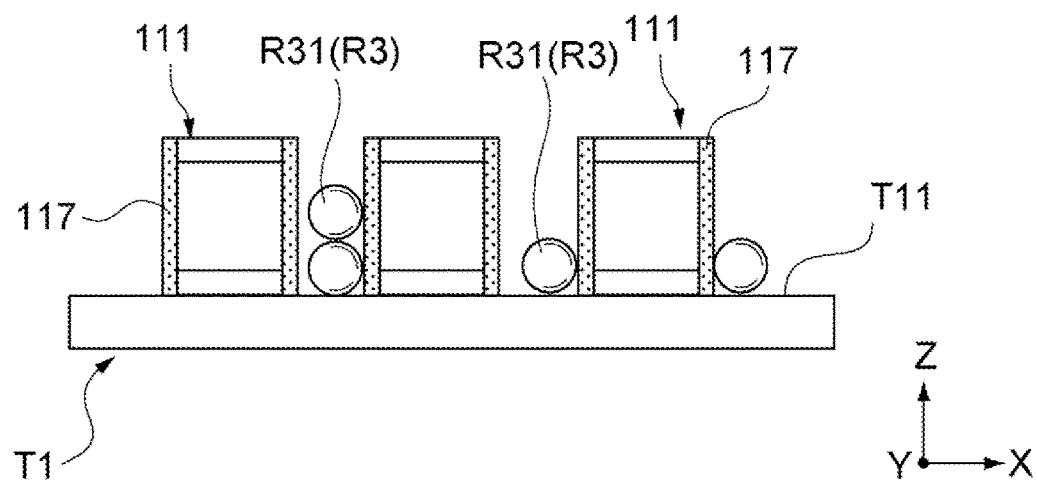
FIG. 20B is a side view showing the process of step S14 according to the fifth embodiment.

FIGS. 20A and 20B are diagrams for explaining step S14 (second heat treatment) in the method for manufacturing a multilayer ceramic capacitor according to a fifth embodiment. The manufacturing method of the multilayer ceramic capacitor of this embodiment includes steps S11 to S16 as in the third and fourth embodiments. However, certain features of the second heat treatment in step S14 differs from that in the third and fourth embodiments, as will be described in detail below.

In the second heat treatment shown in FIG. 20A, the plurality of ceramic main bodies 111 are heated while the plurality of particles R31 are mixed with the plurality of ceramic main bodies 111 on the work table T1. In this embodiment, the intervening member R3 corresponds to the plurality of particles R31.

As the work table, the work table T1 including the work surface T11 along the XY plane can be used as in the first embodiment. The work table T1 may be, for example, a heat-resistant tray.

The particles R31 are small rigid bodies that can be arranged between the ceramic main bodies 111, and have an appropriate shape, such as spherical, ellipsoidal, polyhedral, columnar, or conical shapes, for example. Among these, from the viewpoint of suppressing damage to the ceramic main body 111, the particles R31 preferably have a spherical shape or a similar shape that is generally recognized as round.

The particles R31 have heat resistance to withstand a second temperature (e.g., 200 to 400° C.), and are made of, for example, metal, ceramic material, or the like.

When the particles R31 are spherical, the diameter of the particles R31 can be appropriately set in view of the size of the ceramic main body 111. The ratio of the diameter of the particles R31 to the width dimension w of the ceramic main body 111 is, for example, 5% or more and 60% or less. Also, the ratio of the number of the particles R31 to the number of ceramic main bodies 111 is, for example, 10% or more and 60% or less.

In the example shown in FIG. 20A, a plurality of particles R31 and a plurality of ceramic main bodies 111 are randomly arranged on the work table T1. The arrangement method is not particularly limited. For example, the ceramic element 111 may be randomly arranged on the work table T1 first, the particles R31 may be disposed thereon, and then the work table T1 may be vibrated to mix them. Alternatively, the plurality of particles R31 and the ceramic main body 111 may be mixed in advance in a container or the like, and then transferred from the container onto the work table T1.

As shown in the side view of FIG. 20B, the particles R31 are arranged between adjacent ceramic main bodies 111. As a result, the adjacent side margin portions 117 are separated from each other, and their contact is suppressed.

Subsequently, the work table T1 on which the plurality of ceramic main bodies 111 have been arranged is put into a furnace and heated in the same manner as the second heat treatment in step S14. As the heating condition, the condition described in the first embodiment can be applied.

Then, after heating and cooling, the work table T1 is taken out from the furnace. In this embodiment, the presence of the particles R31 makes it easier for the adjacent ceramic main bodies 111 to be separated from each other, and makes it easier for some of the ceramic main bodies 111 to tilt. By performing the second heat treatment in step S14 in this state, sticking of the side margin portions 117 of different ceramic main bodies 111 is more effectively suppressed.

Sixth Embodiment

In each of the above embodiments, the manufacturing method included the first heat treatment in step S13. On the other hand, there is also a demand for suppressing sticking of the side margin portions 117 during the binder removal in an even simpler manner with an even fewer man-hours.

Therefore, in the manufacturing method of the multilayer ceramic electronic component of a sixth embodiment, the first heat treatment in step S13 is not performed, and the heat treatment for binder removal is performed using an appropriate intervening member (R1, R2, R3).

Figure 21:
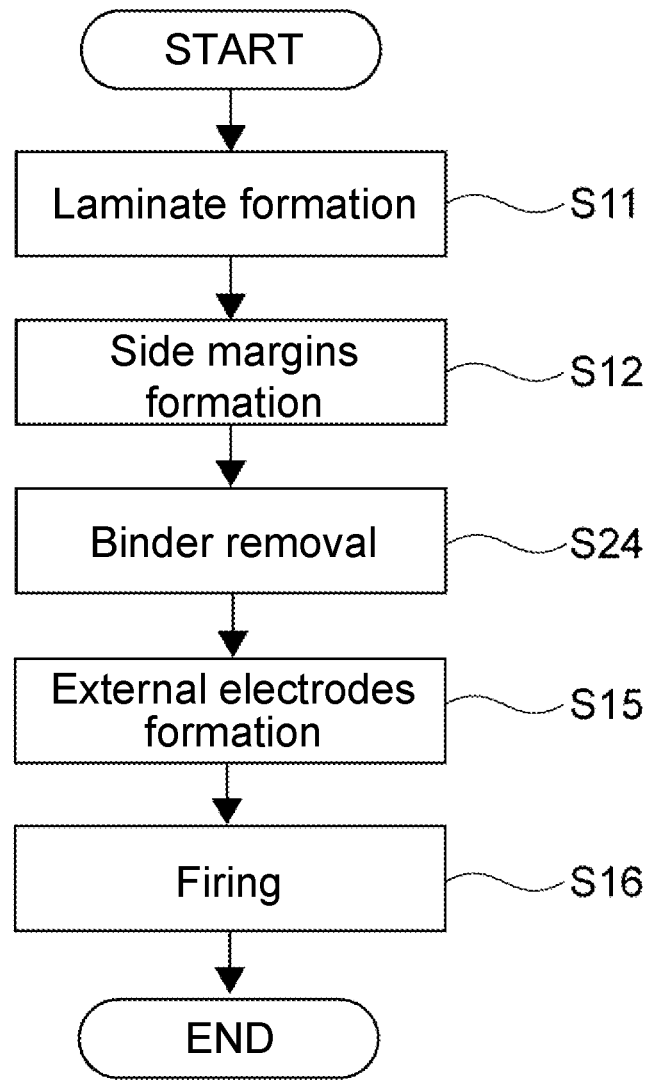
FIG. 21 is a flow chart showing a method of manufacturing a multilayer ceramic capacitor according to a sixth embodiment of the present invention.

FIG. 21 is a flow chart showing a manufacturing method of the multilayer ceramic capacitor of this embodiment. The manufacturing method of the multilayer ceramic capacitor of this embodiment includes steps S11, S12, S15 and S16 similar to those of the first embodiment, but does not include the first heat treatment of step S13. Further, the manufacturing method of the multilayer ceramic capacitor includes a step S24 of removing the binder after the step S12 of forming the side margin portions 117.

In this embodiment, the binder removal step of step S24 is performed in a manner similar to the second heat treatment of step S14 described above in the third to fifth embodiments. That is, in this step S24, the plurality of ceramic main bodies 111 are heated in a state in which the intervening member is arranged between the plurality of unfired ceramic main bodies 111 arranged on the work table extending along the XY plane. This way, the binder resin in the ceramic main body 111 including the side margin portions 117 is removed. As the heating condition in the binder removal process, the second condition described in the first embodiment can be applied.

For example, in the binder removal step of step S24, the work table T2 may be configured to have a mesh tray as the intervening member R1, as in step S14 of the third embodiment.

Alternatively, in the binder removal step of step S24, similarly to step S14 of the fourth embodiment, the work table T3 may have a surface T31 extending along the XY plane and a plurality of protrusions T32 protruding from the surface T31, thereby forming the intervening member R2 by the plurality of protrusions T32.

In the alternative, in the binder removal step of step S24, as in step S14 of the fifth embodiment, a plurality of ceramic main bodies 111 may be heated while a plurality of particles R21 as the intervening member R3 are mixed with the plurality of ceramic main bodies 111 on the work table T1.

As a result, the first heat treatment can be omitted, and the number of man-hours can be reduced. Further, by using an intervening member in step S24, it is possible to prevent side margin portions 117 from sticking in step S24 even when side margin portions 117 contain a binder resin of 10% by mass or more.

According to the findings of the present inventor, when the binder removal process is performed at a heating temperature of 200 to 400° C. using the above intervening member (for example, a mesh tray or particles), even if the first heating process is not performed, the percentage of defective products is 5% or less with respect to all the ceramic element bodies 111 placed on the work table.

OTHER EMBODIMENTS

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

For example, in the above embodiment, the firing of the external electrodes and the firing of the ceramic main body are performed in the same firing step (step S16), but they may be performed in separate steps. That is, step S16 may be performed before step S15, and the formation of the external electrodes in step S15 may be performed on the fired ceramic main body 11.

Also, in this case, the binder removal in step S14 and the firing in step S16 may be performed continuously.

In another example, in the binder removal step (steps S14 or S24) that uses an intervening member, a plurality of types of intervening members may be used as the intervening member. For example, a plurality of particles may be mixed with ceramic main bodies and arranged on a work table configured as a mesh tray.

Furthermore, the present invention is applicable not only to multilayer ceramic capacitors, but also to multilayer ceramic electronic components in general that have a multilayer body and a pair of side margin portions. Examples of multilayer ceramic electronic components to which the present invention can be applied include, in addition to multilayer ceramic capacitors, chip varistors, chip thermistors, and multilayer inductors.

What is claimed is:

1. A method for manufacturing a multilayer ceramic electronic component, comprising:
    forming a pair of side margin portions on side surfaces of each of a plurality of unfired laminates, respectively, by thermocompression bonding a ceramic sheet containing 10% by mass or more of a binder resin to one of the side surfaces of the laminate for forming each of the side margin portions, each of the laminates having a substantially rectangular parallelepiped shape and including a plurality of internal electrodes stacked in a first axis direction via ceramic layers interposed therebetween, side edges of the plurality of internal electrodes being exposed at the side surfaces of the laminate in a second axis direction perpendicular to the first axis direction before being covered by the side margin portions, respectively;

performing a first heat treatment on the plurality of laminates having the pair of side margin portions formed thereon in a first condition so as to remove a portion of the binder resin contained in the side margin portions; and thereafter, performing a second heat treatment on the plurality of laminates having the pair of side margin portions formed thereon in a second condition that is different from the first condition so as to remove a remaining binder resin from the side margin portions.

2. The method according to claim 1, wherein the first heat treatment is performed at a first temperature, and the second heat treatment is performed at a second temperature that is higher than the first temperature.

3. The method according to claim 1,
wherein the first heat treatment includes irradiating at least one of the pair of side margin portions of at least some of the plurality of laminates having the pair of side margin portions formed thereon with light rays to locally heat the irradiated side margin portions so as to remove the portion of the binder resin from the irradiated side margin portions, and
wherein the second heat treatment includes heating the plurality of laminates having the pair of side margin portions formed thereon in a furnace so as to remove the remaining binder resin.

4. The method according to claim 1, wherein the second heat treatment includes heating the plurality of laminates having the pair of side margin portions formed thereon in a state in which an intervening member is placed between the plurality of laminates arranged on a work surface that extends planarly.

5. The method according to claim 4, wherein the work surface has the intervening member that extends planarly and that has a plurality of openings.

6. The method according to claim 5, wherein the intervening member has a mesh structure.

7. The method according to claim 4, wherein the intervening member includes a plurality of particles, and the second heat treatment includes heating the plurality of laminates having the pair of side margin portions formed thereon in a state in which the plurality of laminates are mixed with the plurality of particles on the work surface.

8. The method according to claim 4, wherein the work surface has a plurality of protrusions as the intervening member.

* * * * *